(12) United States Patent
Glöge et al.

(10) Patent No.: US 10,670,884 B2
(45) Date of Patent: Jun. 2, 2020

(54) SPECTACLE LENS AND METHOD FOR PRODUCING SAME

(71) Applicant: Carl Zeiss Vision International GmbH, Aalen (DE)

(72) Inventors: Thomas Glöge, Schorndorf (DE); Jeremias Gromotka, Aalen (DE); Bernhard von Blanckenhagen, Aalen (DE); Ralf Meschenmoser, Essingen (DE); Michael Totzeck, Schwäbisch Gmünd (DE); Markus Haidl, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/388,826

(22) Filed: Apr. 18, 2019

(65) Prior Publication Data
US 2019/0243161 A1 Aug. 8, 2019

Related U.S. Application Data

(63) Continuation of application No. PCT/EP2017/076810, filed on Oct. 20, 2017.

(30) Foreign Application Priority Data

Oct. 21, 2016 (EP) .................................... 16195142

(51) Int. Cl.
G02C 7/02 (2006.01)
B29D 11/00 (2006.01)
(Continued)

(52) U.S. Cl.
CPC ........ G02C 7/022 (2013.01); B29D 11/00009 (2013.01); B29D 11/00403 (2013.01);
(Continued)

(58) Field of Classification Search
CPC ........................... G02C 7/022; G02C 2202/16
(Continued)

(56) References Cited

U.S. PATENT DOCUMENTS 3,998,531 A 12/1976 Marzouk
4,161,547 A * 7/1979 Kienel .................. G02B 1/115
428/213
(Continued)

FOREIGN PATENT DOCUMENTS

AU 64179/80 A 5/1981
AU 531647 B2 9/1983
(Continued)

OTHER PUBLICATIONS

"Ophthalmic optics—Spectacle lenses—Vocabulary (ISO 13666:2012)," German and English version EN ISO 13666:2012, Oct. 2013.
(Continued)

*Primary Examiner* — Zachary W Wilkes
(74) *Attorney, Agent, or Firm* — Thrive IP®; Georg Hasselmann

(57) ABSTRACT

A spectacle lens contains, starting from the object-sided front surface of the spectacle lens to the opposite rear-side of the spectacle lens, at least a) one component A including an ultrathin glass, b) one component B including at least one polymer material and/or at least one mineral glass, c) one component C, including at least one functional layer and/or an ultra-thin glass. A method for producing such a spectacle lens is also disclosed.

17 Claims, 3 Drawing Sheets

(51) Int. Cl.
  *B33Y 10/00* (2015.01)
  *B33Y 80/00* (2015.01)
  *G02C 7/10* (2006.01)
  *G02C 7/12* (2006.01)

(52) U.S. Cl.
  CPC .. *B29D 11/00413* (2013.01); *B29D 11/00432* (2013.01); *B33Y 10/00* (2014.12); *B33Y 80/00* (2014.12); *G02C 7/102* (2013.01); *G02C 7/108* (2013.01); *G02C 7/12* (2013.01); *G02C 2202/14* (2013.01); *G02C 2202/16* (2013.01)

(58) Field of Classification Search
  USPC ............................ 351/159.57, 159.7, 159.62
  See application file for complete search history.

(56) References Cited

U.S. PATENT DOCUMENTS

| | | | |
|---|---|---|---|
| 4,211,823 A | | 7/1980 | Masaharu et al. |
| 4,294,950 A | | 10/1981 | Kato |
| 4,355,135 A | | 10/1982 | January |
| 4,679,918 A | * | 7/1987 | Ace .......................... G02C 7/02 351/159.62 |
| 4,793,703 A | * | 12/1988 | Fretz, Jr. ................. G02C 7/02 351/159.62 |
| 5,959,761 A | | 9/1999 | Perrott et al. |
| 6,231,183 B1 | * | 5/2001 | Dillon .................... G02C 7/022 351/159.6 |
| 6,719,928 B2 | * | 4/2004 | Dillon .................... G02C 7/022 264/1.32 |
| 6,793,339 B1 | * | 9/2004 | Yip ........................ G02B 1/105 351/159.62 |
| 7,350,917 B2 | | 4/2008 | Kawai et al. |
| 7,838,068 B2 | | 11/2010 | Lacan et al. |
| 8,503,080 B2 | | 8/2013 | Seesselberg et al. |
| 9,017,820 B2 | * | 4/2015 | Tamura ................... C03C 27/10 428/426 |
| 9,096,014 B2 | | 8/2015 | Kumar et al. |
| 9,096,026 B2 | * | 8/2015 | Hall ................... B29D 11/0073 |
| 9,278,885 B2 | | 3/2016 | Lacan et al. |
| 9,671,622 B1 | * | 6/2017 | Vetrini .................... G02C 7/104 |
| 9,738,040 B2 | | 8/2017 | Meschenmoser et al. |
| 9,817,155 B2 | | 8/2017 | Neuffer |
| 9,957,398 B2 | | 5/2018 | Hugenberg et al. |
| 10,179,831 B2 | | 1/2019 | Weippert |
| 10,259,744 B2 | | 4/2019 | Gloege |
| 10,338,278 B2 | | 7/2019 | Gloege et al. |
| 10,520,756 B2 | * | 12/2019 | Gallina ................... B32B 23/20 |
| 10,534,196 B2 | * | 1/2020 | Putz ....................... G02C 7/086 |
| 2003/0003295 A1 | | 1/2003 | Dreher et al. |
| 2004/0220292 A1 | | 11/2004 | Momoda et al. |
| 2005/0046957 A1 | | 3/2005 | Lai et al. |
| 2006/0066947 A1 | | 3/2006 | Henry |
| 2006/0269741 A1 | | 11/2006 | Izumi et al. |
| 2007/0076167 A1 | | 4/2007 | Kumar et al. |
| 2008/0198325 A1 | | 8/2008 | Bonnin et al. |
| 2013/0141693 A1 | * | 6/2013 | McCabe ........... B29C 45/14819 351/159.56 |
| 2014/0211150 A1 | * | 7/2014 | Suzuki .................. G02B 1/105 351/159.57 |
| 2015/0219931 A1 | * | 8/2015 | Grasso ..................... G02C 7/10 351/159.56 |
| 2015/0301253 A1 | | 10/2015 | Henry |
| 2016/0041408 A1 | | 2/2016 | Carlson et al. |
| 2016/0161761 A1 | | 6/2016 | Quere et al. |
| 2016/0231595 A1 | | 8/2016 | Grasso |
| 2017/0174823 A1 | | 6/2017 | Weippert |
| 2017/0297955 A1 | | 10/2017 | Gloege |
| 2019/0324289 A1 | * | 10/2019 | Gloge .............. B29D 11/00865 |

FOREIGN PATENT DOCUMENTS

| | | |
|---|---|---|
| CA | 1139952 A1 | 1/1983 |
| CA | 1144466 A1 | 4/1983 |
| CN | 2349591 Y | 11/1999 |
| CN | 1657975 A | 8/2005 |
| CN | 101446693 A | 6/2009 |
| CN | 101512396 A | 8/2009 |
| CN | 102565890 A | 7/2012 |
| CN | 105637409 A | 6/2016 |
| DE | 19519975 C1 | 10/1996 |
| DE | 19848591 A1 | 10/1999 |
| DE | 69534779 T2 | 7/2006 |
| DE | 102007025151 A1 | 9/2008 |
| DE | 102012210185 A1 | 12/2013 |
| DE | 102013222232 A1 | 4/2015 |
| DE | 102014202609 A1 | 8/2015 |
| DE | 102015209794 A1 | 12/2016 |
| EP | 28974 A1 | 5/1981 |
| EP | 28975 A1 | 5/1981 |
| EP | 182503 A2 | 5/1986 |
| EP | 217502 A1 | 4/1987 |
| EP | 1392613 A1 | 3/2004 |
| EP | 1674898 A1 | 6/2006 |
| EP | 1918760 A1 | 5/2008 |
| EP | 1965235 A1 | 9/2008 |
| EP | 2437084 A1 | 4/2012 |
| EP | 2578649 A1 | 4/2013 |
| EP | 2664659 A1 | 11/2013 |
| JP | 2008191186 A | 8/2008 |
| WO | 9845113 A1 | 10/1998 |
| WO | 2002092524 A1 | 11/2002 |
| WO | 2005050265 A2 | 6/2005 |
| WO | 2006050891 A1 | 5/2006 |
| WO | 2009029198 A2 | 3/2009 |
| WO | 2009041707 A1 | 4/2009 |
| WO | 2009056196 A1 | 5/2009 |
| WO | 2009156784 A1 | 12/2009 |
| WO | 2015121341 A1 | 8/2015 |
| WO | 2015160612 A1 | 10/2015 |

OTHER PUBLICATIONS

International Search Report of the International Searching Authority issued in PCT/EP2017/076810, to which this application claims priority, and English-language translation thereof, dated Jan. 19, 2018.
Written Opinion of the International Searching Authority issued in PCT/EP2017/076810, to which this application claims priority, dated Apr. 26, 2018.
International Preliminary Examination Report of the International Searching Authority issued in PCT/EP2017/076810, to which this application claims priority, and English-language translation thereof, dated Feb. 22, 2019.
Office Action of the Canadian Patent Office issued in CA 3041171, which is a counterpart hereof, dated May 30, 2019.
Office action by the Chinese Patent Office issued in CN 201780064497.5, which is a counterpart hereof, dated Feb. 7, 2020, and English-language translation thereof.

* cited by examiner

SPECTACLE LENS AND METHOD FOR PRODUCING SAME

CROSS REFERENCE TO RELATED APPLICATIONS

This application is a continuation application of international application PCT/EP2017/076810, filed Oct. 20, 2017, which claims priority to European patent application EP 16195142.1, filed Oct. 21, 2016, both of which are hereby incorporated by reference in their entireties.

TECHNICAL FIELD

The present disclosure relates to a spectacle lens comprising at least components A, B, and C, wherein at least component A comprises an ultrathin lens. The present disclosure further relates to at least one process for producing such a spectacle lens. The disclosure additionally relates to the use of an ultrathin lens for production of a spectacle lens comprising at least components A, B, and C.

BACKGROUND

Spectacle lenses are distinguished between spectacle lenses having no nominal dioptric power and corrective spectacle lenses, i.e., spectacle lenses having dioptric power. According to DIN EN ISO 13666, dioptric power is the collective term for the focusing and the prismatic power of a spectacle lens.

In the case of corrective spectacle lenses, a distinction is also drawn between monofocal spectacle lenses and multifocal spectacle lenses. A monofocal spectacle lens is a spectacle lens in which there is only one dioptric power. A multifocal spectacle lens is a spectacle lens in which there are two or more different regions having different dioptric powers in the spectacle lens.

The shape that the spectacle lens has to adopt on its front face and/or reverse face in order to obtain the desired optical correction is determined to a crucial degree by the material from which the spectacle lens is manufactured. The most important parameter here is the refractive index of the material used. While spectacle lenses used to be produced predominantly from mineral glasses, especially crown glasses (Abbe number >55) and flint glasses (Abbe number <50), spectacle lenses made from a multitude of organic materials have now become available. The refractive index of the mineral glasses suitable for spectacle lenses may be higher than the refractive index of the organic materials usable for spectacle lenses. Particular features of spectacle lenses based on mineral glasses are their high scratch resistance and good chemical stability. By comparison, spectacle lenses based on organic materials have the particular features of lower specific weight and high fracture resistance.

Spectacle lenses based on mineral glasses are regularly produced by mechanically abrasive machining of a spectacle lens blank. In a spectacle lens blank, neither the front face nor the reverse face already corresponds to the ultimate, optically effective target faces. The optical face of a spectacle lens destined for arrangement on the object side is referred to as the front face; the optical face of a spectacle lens destined for arrangement on the eye side is referred to as the reverse face. The face between them, which either directly forms an edge or indirectly adjoins the front face at one end and the reverse face at the other end via an edge face, is referred to as cylinder edge face. The above-defined terms "front face," "reverse face," and "cylinder edge face" are used analogously hereinafter for semifinished spectacle lenses and finished spectacle lenses.

Spectacle lenses based on organic materials are cast, for example, as semifinished spectacle lenses with spherical, rotationally symmetric aspherical, or progressive front faces in mass production in prototypes with front face and reverse face mold shells that are spaced apart from one another by means of a sealing ring, forming a cavity, as described, for example, in JP 2008191186 A. The reverse face of a semifinished spectacle lens thus produced can, for example, be machined in a mechanically abrasive manner to obtain a finished spectacle lens.

Semifinished spectacle lenses, also referred to as semifinished products, are spectacle lens blanks having a front face or reverse face that already corresponds to the ultimate, optically effective target face. Finished spectacle lenses, also referred to as ready-made or finished products or readymade spectacle lenses, are spectacle lenses having a front face and reverse face that is already the ultimate, optically effective target face. Finished spectacle lenses may, for example, either be cast as finished spectacle lenses, for example in prototypes with front and reverse face mold shells spaced apart from one another by means of a sealing ring, forming a cavity, or be manufactured by means of an Rx process. Finished spectacle lenses are generally also edged, i.e., converted to the ultimate shape and size matched to the spectacle frame by edge processing. Rx process is understood to mean the application-specific prescription manufacture in accordance with the prescription data for a spectacle wearer. The starting material used is semifinished spectacle lenses.

EP 0 182 503 A2 discloses an ophthalmic composite spectacle lens comprising a thin glass layer having a thickness of 0.5 mm to 2.0 mm on the object side and a plastic layer on the eye side. The glass layer and the plastic layer are bonded to one another by a highly elastic adhesive. The reverse face of the glass layer here has a different curvature than the front face of the plastic layer. The gap that arises as a result at the edge in particular is filled by the adhesive used.

SUMMARY

It was an object of the present disclosure to provide a spectacle lens that offers exceptional protection for functional layers of the spectacle lens. In one exemplary embodiment, the spectacle lens is also to combine the advantages of spectacle lenses based on mineral glasses and the advantages of spectacle lenses based on organic materials in a single spectacle lens. More particularly, in this exemplary embodiment, a spectacle lens having high scratch resistance and simultaneously a low specific weight is to be provided. Furthermore, a simple process for producing spectacle lenses having protected functional layers is to be provided.

This object is achieved by providing a spectacle lens comprising, proceeding from the front face on the object side of the spectacle lens to the opposite reverse face of the spectacle lens, at least a) a component A comprising an ultrathin lens,
b) a component B comprising at least one polymeric material and/or at least one mineral glass, where the polymeric material takes the form of a finished spectacle lens or of a polymer film and the mineral glass takes the form of a finished spectacle lens, and
c) a component C comprising at least one functional layer $F_C$ and/or an ultrathin lens.

Exemplary embodiments of spectacle lenses are specified below.

The object was further achieved by providing a process for producing a spectacle lens comprising, proceeding from the front face on the object side of the spectacle lens to the opposite reverse face of the spectacle lens, at least components A, B, and C, where component A comprises an ultrathin lens, component B comprises at least one polymeric material and/or at least one mineral glass, component C comprises at least one functional layer $F_C$ and/or an ultrathin lens, and the process comprises the following steps:

i. providing an optionally formed ultrathin lens of component A and optionally providing an optionally formed ultrathin lens of component C, ii. optionally coating the reverse face $R_{DA}$ of the ultrathin lens of component A with at least one functional layer $F_{RA}$, iii. optionally coating the front face $V_{DC}$ of the ultrathin lens of component C with at least one functional layer $F_{VC}$, iv. providing a semifinished spectacle lens of component B comprising a polymeric material or a mineral glass, where the optically effective target face of component B may optionally be covered with a functional layer, v. bonding the optically effective target face of component B to the reverse face of component A or the front face of component C, vi. converting the opposite face of component B from the optically effective target face to a likewise optically effective target face, vii. bonding the spectacle lens obtained in step vi. comprising components A and B or B and C to the ultrathin lens of component C or to the ultrathin lens of component A or coating the spectacle lens obtained in step vi. comprising components A and B with at least one functional layer $F_C$, viii. optionally coating the front face $V_{DA}$ of the ultrathin lens of component A with at least one functional layer $F_{VA}$ and optionally the reverse face $R_{DC}$ of the ultrathin lens of component C with at least one functional layer $F_{RC}$, and ix. edging the spectacle lens obtained in step vii. or viii. comprising components A, B, and C.

Alternatively, the object is achieved by providing processes for producing a spectacle lens as disclosed herein.

The disclosure further provides for the use of an ultrathin lens for production of a spectacle lens and an ultrathin lens as disclosed herein.

The spectacle lenses of the disclosure comprise, on the front face on the object side of the spectacle lens, at least one component A comprising at least one ultrathin lens. On the opposite, eye-side reverse face of the spectacle lens, component C may likewise comprise an ultrathin lens, where the ultrathin lens of component A and the ultrathin lens of component C may be identical or different than one another. The ultrathin lenses of the two components A and C may, for example, be identical in relation to the glass composition, to the average thickness or to the shape. The glass composition, the average thickness and/or the shape of the ultrathin lens of component A may alternatively be different than the glass composition, the average thickness and/or the shape of the ultrathin lens of component C. For example, the ultrathin lens of component A and the ultrathin lens of component C may be based on an identical glass composition; the average thickness and/or shape of the two ultrathin lenses may be different than one another.

The ultrathin lens of component A and of component C may be based on various glass compositions. Component A and component C may comprise an ultrathin lens which is identical or different in relation to the glass composition. The glass composition for the ultrathin lenses may, for example, be borosilicate glass, aluminoborosilicate glass or alkali-free borosilicate glass. Typically, the ultrathin lens of component A or of component C is based in each case on a borosilicate glass or an aluminoborosilicate glass.

The ultrathin lens of component A or of component C in each case typically has an average thickness from a range from 10 µm to 1000 µm, further typically from a range from 13 µm to 760 µm, further typically from a range from 16 µm to 510 µm, more typically from a range from 18 µm to 390 µm and most typically from a range from 19 µm to 230 µm. Especially typically, the ultrathin lens of component A or the ultrathin lens of component C in each case has an average thickness from a range from 21 µm to 121 µm.

The average thickness of the ultrathin lens of component A or component C is understood in each case to mean the arithmetic average, unless stated otherwise.

Below an average thickness of 10 µm, the ultrathin lens of component A or of component C is too mechanically unstable to be able to be used in one of the processes described hereinafter for production of a spectacle lens of the disclosure. Above an average thickness of 1000 µm, the ultrathin lens of component A or of component C can lead to spectacle lenses of the disclosure that would have too great an edge thickness or too great a middle thickness of the spectacle lens.

The average thickness of the ultrathin lens of components A and C is measured in each case typically with the Filmetrics F10-HC instrument (from Filmetrics Inc.). The average thickness of the ultrathin lens of components A and C is typically determined in each case using the ultrathin lens in the form as it is actually used. The average thickness of the ultrathin lens of components A and C is thus determined in each case either using a planar ultrathin lens or using a formed ultrathin lens prior to the joining to component B. Alternatively, the average thickness of the ultrathin lens of components A and C can be determined in each case by means of a scanning electron micrograph using a polished section. The respective average thickness can be determined by means of a scanning electron micrograph either using the ultrathin lens of component A, using the ultrathin lens of component C or using the inventive spectacle lens comprising components A, B, and C. For this purpose, the thickness of the ultrathin lens of component A or of component C is determined in each case at at least 100 sites and statistically averaged. Typically, the average thickness of the ultrathin lens of component A or of component C is determined by means of a scanning electron micrograph using a polished section of the spectacle lens of the disclosure. If further components are present in the spectacle lens of the disclosure, the respective average thickness thereof is likewise determined as described above.

In one exemplary embodiment, the relative standard deviation of the thickness distribution of the ultrathin lens of component A or C is in each case 0.1% to 100%, typically 0.2% to 81%, more typically 0.3% to 66% and most typically 0.4% to 24%. The relative standard deviation in [%] is the quotient of calculated standard deviation and average thickness.

The ultrathin lens of component A and of component C may have the same average thickness in each case. The average thicknesses of the ultrathin lenses of components A and C may also be different. Typically, the average thicknesses of the ultrathin lenses of components A and C are each the same.

The ultrathin lens of component A or of component C in each case typically has a surface roughness Ra of <1 nm. Further typically, the surface roughness Ra of the ultrathin lens of component A or of component C is in each case within a range from 0.1 nm to 0.8 nm, more typically within a range from 0.3 nm to 0.7 nm and most typically within a range from 0.4 nm to 0.6 nm. The aforementioned values for surface roughness Ra are each based on the front face and the reverse face of the ultrathin lens of component A or C of an unformed, planar ultrathin lens. After forming, the aforementioned values are in each case applicable only to that area of the ultrathin lens that has not been brought into contact with the shaped body. Depending on the shaped body used for forming, the aforementioned values may also be applicable to the area of the ultrathin lens that was in contact with the shaped body used for forming. The surface roughness Ra of the ultrathin lens of component A or of component C is typically determined by means of white light interferometry, typically with the NewView 7100 instrument (from Zygo Corporation).

If the ultrathin lens of component A or of component C has further superficial unevenness, the area analysis of the respective surface can also be determined by phase-measuring deflectometry, typically with the SpecGage instrument (from 3D-Shape GmbH).

The transformation temperature $T_G$ of the ultrathin lens of component A or of the ultrathin lens of component C is in each case typically within a range from 400° C. to 800° C., further typically within a range from 430° C. to 770° C., more typically within a range from 490° C. to 740° C. and most typically within a range from 530° C. to 730° C. The transformation temperature $T_G$ of the ultrathin lens of component A or C can determined in each case by means of dynamic-mechanical analysis, typically with the DMA 8000 Dynamic Mechanical Analyzer instrument (from Perkin Elmer Inc.), or by means of dynamic differential calorimetry, typically with the DSC204CEL instrument with TASC414/3A or CC2001 controller (each from Erich NETZSCH GmbH & Co. Holding KG). Typically, the transformation temperature $T_G$ of the ultrathin lens of component A or C is determined in each case by means of dynamic differential calorimetry.

The coefficient of expansion of the ultrathin lens of component A or component C is in each case typically within a range from $1.8 \cdot 10^{-6} K^{-1}$ to $9.1 \cdot 10^{-6} K^{-1}$, further typically within a range from $2.1 \cdot 10^{-6} K^{-1}$ to $8.8 \cdot 10^{-6} K^{-1}$, more typically within a range from $2.6 \cdot 10^{-6} K^{-1}$ to $8.2 \cdot 10^{-6} K^{-1}$ and most typically within a range from $3.0 \cdot 10^{-6} K^{-1}$ to $7.4 \cdot 10^{-6} K^{-1}$, based in each case on the temperature range from 20° C. to 300° C. The coefficient of expansion of the ultrathin lens of component A or of component C is typically detected in each case by means of dilatometry, typically with the DIL 402 E/7 instrument (from Erich NETZSCH GmbH & Co. Holding KG).

The ultrathin lens of component A and of component C typically in each case does not comprise any colorants. Further typically, the transmittance of the ultrathin lens of component A or of component C in the wavelength range from 400 nm to 800 nm is in each case ≥90%, more typically ≥92%. The transmittance of the ultrathin lens of component A or of component C is typically determined by means of a UV/VIS spectrophotometer, typically with the LAMBDA 950 UV/Vis/NIR Spectrophotometer (from Perkin Elmer Inc.).

The ultrathin lens of component A or of component C in each case typically has a refractive index from a range of n=1.490 to n=1.950, further typically from a range of n=1.501 to n=1.799, more typically from a range of n=1.510 to n=1.755 and most typically from a range from n=1.521 to n=1.747, where the refractive index is reported for the wavelength of the sodium D line. The refractive index of the respective ultrathin lens of component A or of component C is typically matched to the respectively directly adjoining functional layer and/or the respectively directly adjoining component, typically component B. At the respective ultrathin lens/functional layer, ultrathin lens/further component interfaces of the spectacle lens of the disclosure, typically component B or ultrathin lens/adhesive interface, the difference in refractive index is in each case typically less than 0.03, more typically less than 0.01, irrespective of whether it is the ultrathin lens of component A, the ultrathin lens of component C or the ultrathin lens of a further component of the spectacle lens of the disclosure. In one exemplary embodiment of the disclosure, all constituents of the spectacle lens of the disclosure, i.e., the ultrathin lens of component A or C, component B, further optional components of the spectacle lens of the disclosure, the adhesive(s) optionally used, and all functional layers arranged within the spectacle lens of the disclosure, typically between components A and C, have the same refractive index. In this exemplary embodiment, the same refractive index tolerates a difference in refractive index from a range from 0.005 to 0.015. The refractive index of the ultrathin lens of component A and of component C, of component B and of further components of the spectacle lens of the disclosure is typically determined separately by refractometry on the respective constituents of the spectacle lens of the disclosure. The measuring instrument used may, for example, be the Anton Paar Abbemat MW instrument (from Anton Paar GmbH).

The ultrathin lens of component A or of component C in each case typically has an Abbe number from a range from 20 to 85, further typically from a range from 23 to 74, more typically from a range from 29 to 66 and most typically from a range from 33 to 61. In one exemplary embodiment of the disclosure, all constituents of the spectacle lens of the disclosure, i.e., the ultrathin lens of component A or C, component B, further optional components of the spectacle lens of the disclosure, the adhesive(s) optionally used, and all functional layers present arranged within the spectacle lens of the disclosure, typically between components A and C, have the same Abbe number. In this exemplary embodiment, the same Abbe number tolerates a difference in the Abbe number from a range from 0.1 to 5, typically from a range from 0.1 to 2.1. The higher the refractive index of all constituents of the spectacle lens of the disclosure, the greater the differences in the Abbe number that are tolerated.

In one exemplary embodiment of the disclosure, the ultrathin lens of component A or of component C and the organic material of component B or the mineral glass of component B each have a maximum Abbe number for a given refractive index n.

In one exemplary embodiment of the disclosure, the ultrathin lens of component A or component C in each case has a transformation temperature $T_G$ from a range from 421° C. to 781° C., typically from a range from 501° C. to 766° C., and in each case has a coefficient of expansion for the temperature range from 20° C. to 300° C. from a range from $2.9 \cdot 10^{-6} K^{-1}$ to $8.3 \cdot 10^{-6} K^{-1}$, typically from a range from $3.1 \cdot 10^{-6} K^{-1}$ to $7.3 \cdot 10^{-6} K^{-1}$. In this exemplary embodiment, the transformation temperature $T_G$ and/or the coefficient of expansion of the ultrathin lens of component A and of the ultrathin lens of component C may each be the same or different.

In a further exemplary embodiment of the disclosure, the ultrathin lens of component A or of component C in each case has an average thickness from a range from 17 µm to 190 µm, typically from a range from 24 µm to 166 µm, and a transformation temperature $T_G$ from a range from 510° C. to 730° C., typically from a range from 555° C. to 721° C. In this exemplary embodiment, the average thickness and/or transformation temperature $T_G$ of the ultrathin lens of component A and of the ultrathin lens of component C may each be the same or different.

In a typical exemplary embodiment, the ultrathin lenses of components A or C and further ultrathin lenses optionally present in the spectacle lens of the disclosure have no photochromic properties.

Ultrathin lenses are commercially available, for example, under the D 263® T eco, AF 32® eco (each from Schott AG) or Corning Willow Glass (from Corning Inc.) names.

The ultrathin lens of component A or of component C may each have different shapes, for example planar or a particular shape. In connection with the shape of the ultrathin lens, "planar" is understood to mean that the ultrathin lens does not have any macroscopically visible bending or curvature. If the ultrathin lenses of components A and C have a nonplanar surface, it is possible to achieve a desired surface topography, for example spherical or toric, by deforming a planar ultrathin lens on a corresponding negative mold. For example, the ultrathin lens of component A or of component C may in each case be configured in the form of a spherical lens with a particular radius of curvature. The shape of the ultrathin lens of components A and C may be identical or different. For forming of a planar ultrathin lens, it may first be cut out, typically in the form of a circle, for example by means of a laser. In the edge region, this cut-out ultrathin lens circle may then be flame-treated in order to seal any microcracks that have formed. In order to produce a minimum amount of ultrathin lens offcut material, the cutout of the ultrathin lens is selected such that a minimum amount of excess ultrathin lens has to be removed after the joining of components A, B, and C of the spectacle lens of the disclosure. The cut-out ultrathin lens may, for example, be placed onto a mold shell suitable for forming, optionally secured by means of a holder, and typically heated together with the mold shell, optionally together with the holder, up to the transformation temperature $T_G$ of the glass composition or up to a temperature which is typically not more than 20° C. above the transformation temperature $T_G$ of the glass composition. The mold shell may, for example, have a convex or concave shape. For example, the cut-out ultrathin lens is pressed into the mold shell with the aid of a counterpart that fits into the mold shell, or the ultrathin lens cutout is formed into the mold shell with application of reduced pressure and/or simply by means of gravity. Preference is given to forming of the ultrathin lens with application of reduced pressure into a mold shell. The formed ultrathin lens is typically allow to cool completely in or above the mold shell before it is separated from the mold shell. The forming of a typically planar cutout of an ultrathin lens is typically effected in a protective gas atmosphere. The mold shell may be configured here as negative mold of the front face or reverse face of the ultrathin lens to be achieved in the forming operation. For example, the mold shell may be formed spherically, aspherically, rotationally symmetrically, torically, atorically, or as a symmetric free-form face or unsymmetric free-form face. Alternatively, the ultrathin lens may be formed in uncut form, typically planar form, with the aid of a thermoforming process. In the presence of further components of the spectacle lens of the disclosure comprising at least one ultrathin lens, the above details are correspondingly applicable.

The radius of curvature of an ultrathin lens is typically within a range from 10 mm to infinity, typically within a range from 20 mm to 1600 mm, further typically within a range from 35 mm to 1535 mm, further typically within a range from 56 mm to 600 mm, more typically within a range from 66 mm to 481 mm and most typically within a range from 75 mm to 376 mm. A radius of curvature of the ultrathin lens of infinity corresponds here to a planar surface. In the case of nonspherical surfaces of the ultrathin lens, the above-specified radii of curvature are each based on an approximate spherical form.

The mold shell usable for forming typically comprises a material that can be processed with removal of material, does not cause any structures in the formed ultrathin lens and additionally does not enter into any inextricable bond to the ultrathin lens. The mold shell may consist, for example, of graphite, a metal (alloy) or a ceramic, as described, for example, in WO 2006/050891 A2. The mold shell may also have been surface-modified, so as to further minimize adhesion of the ultrathin lens.

The front face of the ultrathin lens $V_{DA}$ of component A is that face of the ultrathin lens that is on the object side in the spectacle lens of the disclosure. The front face of the ultrathin lens $V_{DC}$ of component C is that face of the ultrathin lens which, in the spectacle lens of the disclosure, is on the object side in the direction of component B or in the direction of a component of the spectacle lens of the disclosure arranged further to the object side. The reverse face of the ultrathin lens $R_{DA}$ of component A is that face of the ultrathin lens which, in the spectacle lens of the disclosure, is on the eye side in the direction of component B or in the direction of a component of the spectacle lens of the disclosure arranged further to the eye side. The reverse face of the ultrathin lens $R_{DC}$ of component C is that face of the ultrathin lens that is on the eye side in the spectacle lens of the disclosure. If more than one of components A, B and/or C is present in the spectacle lens of the disclosure, the front face thereof is defined each case as that face arranged on the object side. In that case, the reverse face is correspondingly that face of the respective component which is on the eye side in the spectacle lens of the disclosure.

The ultrathin lens of component A typically comprises at least one functional layer $F_{VA}$ on the front face of the ultrathin lens $V_{DA}$. The functional layer $F_{VA}$ may comprise, for example, at least one antireflection layer, at least one electrically conductive or semiconductive layer, at least one antifog layer and/or at least one clean-coat layer. Typically, the functional layer $F_{VA}$ comprises at least one antireflection layer, more typically at least one antireflection layer and at least one clean-coat layer, in which latter case the clean-coat layer is the outermost layer on the object side of the spectacle lens of the disclosure.

The ultrathin lens of component C typically comprises at least one functional layer $F_{RC}$ on the reverse face of the ultrathin lens $R_{DC}$. The functional layer $F_{RC}$, like the functional layer $F_{VA}$, may comprise, for example, an antireflection layer, at least one electrically conductive or semiconductive layer, at least one antifog layer and/or at least one clean-coat layer. Typically, the functional layer $F_{RC}$ comprises at least one antireflection layer, more typically one antireflection layer, and a clean-coat layer, in which latter case the clean-coat layer is the outermost layer on the eye side of the spectacle lens of the disclosure.

The at least one functional layer $F_{VA}$ on the front face $V_{DA}$ of the ultrathin lens of component A and the at least one functional layer $F_{RC}$ on the reverse face $R_{DC}$ of the ultrathin lens of component C may be identical or different. Typically, the at least one functional layer $F_{VA}$ and the at least one functional layer $F_{RC}$ are identical.

The terms "layer" and "coating" are used interchangeably in the context of this disclosure.

If the functional layer $F_{VA}$ on the front face $V_{DA}$ of the ultrathin lens of component A comprises at least one antireflection layer, it typically comprises alternating discrete metal oxide, metal hydroxide and/or metal oxide hydrate layers composed of or comprising aluminum, silicon, zirconium, titanium, yttrium, tantalum, neodymium, lanthanum, niobium, and/or praseodymium. In one exemplary embodiment of the disclosure, the antireflection layer comprises at least one metal oxide, metal hydroxide, and/or metal oxide hydrate layer composed of or comprising silicon, where typically at least one silicon oxide, silicon hydroxide, and/or silicon oxide hydrate layer constitutes the outer layer on the object side of the antireflection layer present on the ultrathin lens of component A.

If the functional layer $F_{RC}$ on the reverse face $R_{DC}$ of the ultrathin lens of component C comprises at least one antireflection layer, it typically comprises alternating discrete metal oxide, metal hydroxide and/or metal oxide hydrate layers composed of or comprising aluminum, silicon, zirconium, titanium, yttrium, tantalum, neodymium, lanthanum, niobium and/or praseodymium. In one exemplary embodiment of the disclosure, the antireflection layer comprises at least one metal oxide, metal hydroxide, and/or metal oxide hydrate layer composed of or comprising silicon, where typically at least one silicon oxide, silicon hydroxide, and/or silicon oxide hydrate layer constitutes the outer layer on the eye side of the antireflection layer present on component C.

In a further exemplary embodiment of the disclosure, the at least one antireflection layer of the spectacle lens of the disclosure has a total layer thickness from a range from 97 nm to 2000 nm, typically from a range from 112 nm to 1600 nm, further typically from a range from 121 nm to 1110 nm, more typically from a range from 132 nm to 760 nm and most typically from a range from 139 nm to 496 nm. The antireflection layer here typically comprises a metal oxide, metal hydroxide and/or metal oxide hydrate layer composed of or comprising silicon, which typically forms the outermost layer of the antireflection layer. The outermost layer in this connection is understood to mean that layer of the antireflection layer which is furthest to the eye side or furthest to the object side in the spectacle lens of the disclosure.

In a further exemplary embodiment of the disclosure, the antireflection layer of the spectacle lens of the disclosure comprises, proceeding from the front face $V_{DA}$ of the ultrathin lens of component A or proceeding from the reverse face $R_{DC}$ of the ultrathin lens of component C, the following layer sequence in each case:

a) metal oxide, metal hydroxide and/or metal oxide hydrate layer composed of or comprising titanium,
b) metal oxide, metal hydroxide and/or metal oxide hydrate layer composed of or comprising silicon,
c) metal oxide, metal hydroxide and/or metal oxide hydrate layer composed of or comprising titanium,
d) metal oxide, metal hydroxide and/or metal oxide hydrate layer composed of or comprising silicon,
e) metal oxide, metal hydroxide and/or metal oxide hydrate layer composed of or comprising titanium,
f) metal oxide, metal hydroxide and/or metal oxide hydrate layer composed of or comprising silicon,
g) metal oxide, metal hydroxide and/or metal oxide hydrate layer composed of or comprising zirconium,
h) metal oxide, metal hydroxide and/or metal oxide hydrate layer composed of or comprising titanium,
i) metal oxide, metal hydroxide and/or metal oxide hydrate layer composed of or comprising zirconium, and
j) metal oxide, metal hydroxide and/or metal oxide hydrate layer composed of or comprising titanium.

In a further exemplary embodiment of the disclosure, the at least one antireflection layer of the spectacle lens of the disclosure comprises the layer sequence and layer thickness indicated in EP 2 437 084 A1, in FIGS. 3 and 5, in each case between the superhydrophobic layer and the hard lacquer layer. Typically, in the context of this disclosure, the layer that adjoins the hard lacquer layer therein in each case on the eye side and the layer that adjoins the superhydrophobic layer in each case on the object side is disposed on the front face in the spectacle lens of the disclosure, and the layer that adjoins the hard lacquer layer therein in each case on the object side and the layer that adjoins the superhydrophobic layer in each case on the eye side is disposed on the reverse face in the spectacle lens of the disclosure.

The at least one antireflection layer in the spectacle lens of the disclosure is typically produced by means of PVD methods.

If the functional layer $F_{VA}$ of the front face $V_{DA}$ of the ultrathin lens of component A and/or the functional layer $F_{RC}$ of the reverse face $R_{DC}$ of the ultrathin lens of component C in each case comprises at least one electrically conductive or semiconductive layer, this may comprise, for example, a layer composed of or comprising indium tin oxide $((In_2O_3)_{0.9} (SnO_2)_{0.1}$; ITO), fluorine tin oxide ($SnO_2$: F; FTO), aluminum zinc oxide (ZnO:Al; AZO) and/or antimony tin oxide ($SnO_2$: Sb; ATO). Typically, the electrically conductive or semiconductive layer comprises a layer composed of or comprising ITO or composed of or comprising FTO.

An electrically conductive or semiconductive layer arranged as the outermost functional layer of the spectacle lens of the disclosure on the object side or eye side reduces or avoids the static charging of the spectacle lens of the disclosure. This in turn facilitates the cleaning of the spectacle lens of the disclosure. In one exemplary embodiment of the disclosure, the electrically conductive or semiconductive layer may be a layer of the antireflection layer.

If the functional layer $F_{VA}$ of the front face $V_{DA}$ of the ultrathin lens of component A and/or the functional layer $F_{RC}$ of the reverse face $R_{DA}$ of the ultrathin lens of component C in each case comprises at least one antifog layer, this typically comprises a silane derivative according to EP 2 664 659 A1, more typically according to claim 4 of EP 2 664 659 A1. Alternatively, the antifog layer may also be produced by the process described in DE 10 2015 209 794 A1, especially by the process described in claim 1 of DE 10 2015 209 794 A1. The antifog layer may be applied directly to the front face $V_{DA}$ of the ultrathin lens of component A or atop an antireflection layer present on the front face $V_{DA}$. If the antifog layer is applied atop an antireflection layer of component A, the outer layer of the antireflection layer on the object side typically comprises a metal oxide, metal hydroxide and/or metal oxide hydrate layer composed of or comprising silicon. The antifog layer may be applied directly to the reverse face $R_{DC}$ of the ultrathin lens of component C or atop an antireflection layer present on the reverse face $R_{DC}$. If the antifog layer is applied atop an antireflection layer of component C, the outer layer of the antireflection layer on the eye side typically comprises a metal oxide, metal hydroxide and/or metal oxide hydrate layer composed of or comprising silicon.

If the functional layer $F_{VA}$ on the front face $V_{DA}$ of the ultrathin lens of component A and/or the functional layer $F_{RC}$ on the reverse face $R_{DC}$ of the ultrathin lens of component C in each case comprises at least one clean-coat layer, this typically comprises a material having oleophobic and hydrophobic properties, as disclosed, for example, in EP 1 392 613 A1, on which water assumes a contact angle of more than 90°, typically of more than 100° and more typically more than 110°. The clean-coat layer typically comprises an organofluorine layer with covalent attachment to the substrate according to DE 198 48 591 A1, claim 1, or a layer based on perfluoropolyethers.

In one exemplary embodiment of the disclosure, the front face $V_{DA}$ of the ultrathin lens of component A, proceeding from the front face $V_{DA}$ in the direction of the object, or the reverse face $R_{DC}$ of the ultrathin lens of component C, proceeding from the reverse face $R_{DC}$, is in each case covered by the following functional layers $F_{VA}$ or $F_{RC}$:

a) optionally at least one electrically conductive or semiconductive layer,
b) at least one antireflection layer, and
c) at least one antifog layer or at least one clean-coat layer.

In this exemplary embodiment, the optionally present at least one electrically conductive or semiconductive layer may also be present as a constituent of the at least one antireflection layer, i.e., at least one of the layers that forms part of the antireflection layer may be present on the front face $V_{DA}$ of the ultrathin lens of component A, followed on the object side by the electrically conductive or semiconductive layer, the rest of the layers that form part of the antireflection layer, and followed further to the object side by the antifog layer or the clean-coat layer. The same is true on the eye side at the reverse face $R_{DC}$ of the ultrathin lens of component C.

The ultrathin lens of component A typically comprises at least one functional layer $F_{RA}$ on the reverse face of the ultrathin lens $R_{DA}$, i.e., the face of the ultrathin lens which, in the spectacle lens of the disclosure, is directed in the direction of component B or in the direction of a component arranged further to the object side of the spectacle lens of the disclosure. The functional layer $F_{RA}$ may comprise, for example, at least one coloring layer, at least one photochromic layer, at least one polarizing layer and/or at least one reflection layer.

In one exemplary embodiment of the disclosure, the at least one functional layer $F_{RA}$ may correspond to the at least one functional layer $F_{VB}$, it being necessary in the presence of multiple functional layers $F_{RA}$ or $F_{VB}$ to take note of the typical layer sequence between components A and B of the spectacle lens of the disclosure.

If the functional layer $F_{RA}$ on the reverse face $R_{DA}$ of the ultrathin lens of component A comprises at least one coloring layer, this typically comprises a colorable layer according to U.S. Pat. No. 4,355,135 A, especially according to claim 1 of U.S. Pat. No. 4,355,135 A, according to U.S. Pat. No. 4,294,950 A, especially according to either of claims 1 and 6 of U.S. Pat. No. 4,294,950 A or according to U.S. Pat. No. 4,211,823 A, especially according to either of claims 1 and 2 of U.S. Pat. No. 4,211,823 A. More typically, the coloring layer comprises a colorable layer according to U.S. Pat. No. 4,355,135 A. The colorant usable for coloring may be selected, for example, from the group consisting of C.I. Disperse Yellow 5, C.I. Disperse Yellow 13, C.I. Disperse Yellow 33, C.I. Disperse Yellow 42, C.I. Disperse Yellow 51, C.I. Disperse Yellow 54, C.I. Disperse Yellow 64, C.I. Disperse Yellow 71, C.I. Disperse Yellow 86, C.I. Disperse Yellow 114, C.I. Disperse Yellow 201, C.I. Disperse Yellow 211, C.I. Disperse Orange 30, C.I. Disperse Orange 73, C.I. Disperse Red 4, C.I. Disperse Red 11, C.I. Disperse Red 15, C.I. Disperse Red 55, C.I. Disperse Red 58, C.I. Disperse Red 60, C.I. Disperse Red 73, C.I. Disperse Red 86, C.I. Disperse Red 91, C.I. Disperse Red 92, C.I. Disperse Red 127, C.I. Disperse Red 152, C.I. Disperse Red 189, C.I. Disperse Red 229, C.I. Disperse Red 279, C.I. Disperse Red 302, C.I. Disperse Red 302:1, C.I. Disperse Red 323, C.I. Disperse Blue 27, C.I. Disperse Blue 54, C.I. Disperse Blue 56, C.I. Disperse Blue 73, C.I. Disperse Blue 280, C.I. Disperse Violet 26, C.I. Disperse Violet 33, C.I. Solvent Yellow 179, C.I. Solvent Violet 36, C.I. Pigment Blue 15, C.I. Pigment Blue 80, C.I. Pigment Green 7, C.I. Pigment Orange 36, C.I. Pigment Orange 36, C.I. Pigment Yellow 13, C.I. Pigment Violet 23, C.I. Pigment Violet 37, C.I. Pigment Black 1, C.I. Pigment Black 6 and C.I. Pigment Black 7.

Alternatively, the coloring layer may also be applied by means of a printing ink, especially 3D printing ink, comprising a colorant.

If the functional layer $F_{RA}$ comprises at least one photochromic layer, it typically comprises a layer according to US 2006/0269741 A1, especially according to US 2006/0269741 A1, claim 6, or a layer according to US 2004/0220292 A1, especially according to US 2004/0220292 A1, claim 1. The photochromic layer typically has an average thickness from a range from 5 μm to 200 μm, further typically from a range from 9 μm to 166 μm, more typically from a range from 17 μm to 121 μm and most typically from a range from 21 μm to 81 μm.

If the functional layer $F_{RA}$ comprises at least one polarizing layer, the latter typically comprises either a polarization film or a layer having polarizing properties.

The polarization film used may be a film of polyvinyl alcohol or polyethylene terephthalate, for example, comprising dichroic colorants. The polarization film may have a monolayer or multilayer film structure. In one exemplary embodiment of the disclosure, the polarization film may have a multilayer structure comprising at least one film layer with dichroic colorants, at least one stabilizing film layer and at least one film layer with dichroic colorants or without dichroic colorants. In this exemplary embodiment, the film layer comprising dichroic colorants, just like the film layer without dichroic colorants, may in each case comprise, for example, a film layer of polyvinyl alcohol, polyvinyl formal, polyvinyl butyral or polyvinyl acetate. As an alternative to dichroic colorants, for example C.I. Direct Blue 67, C.I. Direct Blue 90, C.I. Direct Blue 200, C.I. Direct Green 59, C.I. Direct Violet 48, C.I. Direct Red 39, C.I. Direct Red 81, C.I. Direct Red 83, C.I. Direct Red 89, C.I. Direct Orange 39, C.I. Direct Orange 72, C.I. Direct Yellow 34, C.I. Direct Green 26, C.I. Direct Green 27, C.I. Direct Green 28, C.I. Direct Green 51 and/or C.I. Direct Black 170, it is also possible to use iodine. In this exemplary embodiment, the stabilizing film layer may comprise, for example, polyethylene terephthalate, polymethacrylate, polymethylmethacrylate, polycarbonate, cellulose acetate butyrate and/or triacetylcellulose. In a further exemplary embodiment of the disclosure, the polarization film may have been preformed to exactly fit the reverse face of the ultrathin lens of component A. Typically, the polarization film is preformed with application of reduced pressure with the aid of a metal mold.

A layer having polarizing properties is disclosed, for example, in EP 1 965 235 A1, EP 0 217 502 A1, EP 1 674 898 A1, US 2006/0066947 A1, WO 2005/050265 A1, WO 2009/029198 A1, WO 2009/156784 A1 or WO 2015/160612 A1. In the aforementioned applications, the layer having polarizing properties is in each case a constituent of a layer sequence described therein. In the context of this disclosure, typically only the layer having polarizing properties which is described in the applications cited is used as polarizing layer. In one exemplary embodiment of the disclosure, the ultrathin lens of component A may be formed, for example, by means of a mold shell which leaves regular, typically linear, surface structuring on that surface of the ultrathin lens which has come into contact with the surface of the mold shell during the forming operation. This surface structuring can be utilized in that the dichroic colorants usable for production of the layer having polarizing properties fill this surface structuring and hence, by contrast with the application cited above, the step of microcrack formation necessary therein or the coating necessary for surface structuring is no longer necessary.

In a typical exemplary embodiment, the functional layer $F_{RA}$ comprises, as polarizing layer, a polarization film, typically a polarization film having a multilayer film structure.

If the functional layer $F_{RA}$ comprises at least one reflection layer, it typically comprises alternating dielectric layers in the manner of a Bragg mirror and/or at least one semitransparent metal layer. The reflection layer is typically a semitransparent metal layer. The at least one semitransparent metal layer may comprise, for example, an aluminum layer, chromium layer, gold layer and/or silver layer. The layer thickness of the semitransparent metal layer is typically within a range from 4 nm to 48 nm, more typically within a range from 8 nm to 41 nm and most typically within a range from 17 nm to 33 nm. The at least one semitransparent metal layer is typically applied by means of a PVD method to the reverse face of the ultrathin lens $R_{DA}$ of component A.

In one exemplary embodiment of the disclosure, the reverse face of the ultrathin lens $R_{DA}$ of component A comprises a reflection layer as functional layer $F_{RA}$ and the front face of the ultrathin lens $V_{DA}$ of component A does not comprise an antireflection layer. In this exemplary embodiment, the spectacle lens of the disclosure may comprise an antireflection layer on the reverse face of the ultrathin lens $R_{DC}$ of component C or adjoining the functional layer $F_C$ of component C on the eye side. In this way, it can be ensured that fewer troublesome reflections from the eye-side reverse face of the spectacle lens of the disclosure reach the eye. Alternatively, the spectacle lens of the disclosure may comprise an antireflection layer and a clean-coat layer on the reverse face of the ultrathin lens $R_{DC}$ of component C or adjoining the functional layer $F_C$ of component C on the eye side, where the clean-coat layer is the closest layer on the eye side.

In a further exemplary embodiment of the disclosure, the reverse face of the ultrathin lens $R_{DA}$ of component A comprises a reflection layer as functional layer $F_{RA}$ and the front face of the ultrathin lens $V_{DA}$ of component A comprises a clean-coat layer. In this exemplary embodiment, the spectacle lens of the disclosure may comprise an antireflection layer or an antireflection layer and a clean-coat layer on the reverse face of the ultrathin lens $R_{DC}$ of component C or adjoining the functional layer $F_C$ of component C on the eye side, in which latter case the clean-coat layer is the outermost layer on the eye side.

In a typical exemplary embodiment of the disclosure, the reverse face of the ultrathin lens $R_{DA}$ of component A comprises exactly one type of functional layer $F_{RA}$, where the functional layer $F_{RA}$ may be selected from the group consisting of coloring layer, photochromic layer, polarizing layer and reflection layer.

In a further exemplary embodiment of the disclosure, the reverse face of the ultrathin lens $R_{DA}$ of component A comprises multiple types of functional layer $F_{RA}$, where the functional layer $F_{RA}$ may be selected from the group consisting of coloring layer, photochromic layer, polarizing layer and reflection layer. In this exemplary embodiment, it is preferable when, in the spectacle lens of the disclosure, proceeding from the front face on the object side to the opposite eye-side reverse face, one of the following combinations of the functional layer $F_{RA}$ is present in the sequence specified between components A and B:

component A/photochromic layer/polarizing layer/coloring layer/component B, component A/photochromic layer/coloring layer/polarizing layer/component B, component A/photochromic layer/polarizing layer/reflection layer/component B, component A/photochromic layer/reflection layer/polarizing layer/component B, component A/photochromic layer/reflection layer/component B, component A/reflection layer/polarizing layer/coloring layer/component B, component A/polarizing layer/coloring layer/component B, component A/reflection layer/polarizing layer/component B, or component A/reflection layer/coloring layer/component B.

In one exemplary embodiment of the disclosure, the spectacle lens of the disclosure comprises components A, B, and C, where the ultrathin lens of component A does not have a functional layer $F_{RA}$ on the reverse face of the ultrathin lens $R_{DA}$. In this case, there may be no layers disposed between components A and B in the spectacle lens of the disclosure, and hence components A and B may be directly bonded to one another in a cohesive and/or form-fitting manner. Alternatively, component B may be a semifinished spectacle lens, the front face of which has been coated with at least one functional layer $F_{VB}$, in which case the outermost functional layer $F_{VB}$ of component B on the object side is bondable in a cohesive and/or form-fitting manner to the reverse face of the ultrathin lens $R_{DA}$.

If the individual components are processed and prepared separately from one another, a decision may be made beforehand as to what kind of layer is typically applied to A, B or C in order to assure optimal process conditions. For example, components A and/or C, if C is an ultrathin lens, may be processed using the vapor deposition parameters in the PVD process for the antireflection coating on mineral glasses. These parameters, which typically comprise the use of temperatures of greater than 200° C. to 800° C., as described, for example, in WO 98/45113 A1 or DE 10 2007 025 151 A, are not compatible with the polymeric materials of component B, and so the spectacle lens of the disclosure comprising components A, B, and C cannot be processed in this way.

In the context of this disclosure, "cohesive bonds" are understood to mean bonds that hold the respective components of the spectacle lens of the disclosure together, typically components A and B or components B and C or components A and C. The bonding of the individual components here may be direct, meaning that neither of the two components to be bonded has a functional layer on that surface which is to be bonded to the other component. Alternatively, at least one of the components may have been covered with at least one functional layer. In the latter case, the cohesive bond is via the outermost functional layer in each case that faces the surface of the component to be attached or its outermost functional layer.

In the context of this disclosure, "form-fitting bonds" are understood to mean bonds in which the individual components of the spectacle lens of the disclosure, typically components A and B or components B and C or components A and C, can be joined together with an exact fit. Functional layers disposed between components A and C generally have the same surface topography as the surface beneath in each case, and so functionally coated components are bondable in a form-fitting manner. Slight differences in the surface topography of the two surfaces to be joined to one another can be filled, for example, by means of an adhesive. In order to be able to bond the individual components of the spectacle lens of the disclosure to one another in a form-fitting manner, the radii of curvature of the respective components to be bonded to one another should typically differ by less than 1 mm, further typically within a range from 0.03 mm to ≤0.8 mm, more typically within a range from 0.04 mm to ≤0.7 mm and most typically within a range from 0.05 mm to ≤0.6 mm.

Both cohesive and form-fitting bonds can be achieved, for example, by thermal treatment and/or by contact bonding and/or by means of an adhesive.

In one exemplary embodiment of the disclosure, the ultrathin lens of component A does not comprise any functional layer $F_{VA}$ on the front face of the ultrathin lens $V_{DA}$.

In a further exemplary embodiment of the disclosure, the ultrathin lens of component A comprises at least one functional layer $F_{VA}$ on the front face of the ultrathin lens $V_{DA}$ and no functional layer $F_{RA}$ on the reverse face of the ultrathin lens $R_{DA}$. In this exemplary embodiment, the at least one functional layer $F_{VA}$ is typically an antireflection layer or an antireflection layer and a clean-coat layer, in which latter case the clean-coat layer is the outer layer on the object side.

In a typical exemplary embodiment, the ultrathin lens of component A comprises at least one functional layer $F_{VA}$ on the front face of the ultrathin lens $V_{DA}$ and at least one functional layer $F_{RA}$ on the reverse face of the ultrathin lens $R_{DA}$. In this exemplary embodiment, the functional layer $F_{VA}$ typically comprises an antireflection layer and the functional layer $F_{RA}$ typically comprises a photochromic layer.

The coating of the ultrathin lens of component A with at least one functional layer $F_{VA}$ on the front face of the ultrathin lens $V_{DA}$ may either precede or follow the combining of component A with the remaining components of the spectacle lens of the disclosure, typically component B or components B and C. Typically, the front face of the ultrathin lens $V_{DA}$ of the spectacle lens of the disclosure, i.e., the spectacle lens comprising typically at least components A, B, and C, is coated with at least one functional layer $F_{VA}$.

Depending on the coating to be applied in each case, the coating of the front face and/or the reverse face of the ultrathin lens of component A may precede or follow any desired forming of the ultrathin lens. Typically, organic layers, for example a photochromic layer or an antifog layer, or a polarization film, are applied after the forming of the ultrathin lens, while inorganic layers, for example an antireflection layer or a reflection layer, may be applied before or after the forming of the ultrathin lens. Typically, inorganic functional layers $F_{VA}$ and/or $F_{RA}$ are applied to the ultrathin lens of component A after forming thereof. The above remarks are correspondingly applicable to the optionally present ultrathin lens of component C.

The ultrathin lens of component C may comprise at least one functional layer $F_{VC}$ on the front face of the ultrathin lens $V_{DC}$. The functional layer $F_{VC}$ may comprise a coloring layer, for example. In addition, the ultrathin lens of component C typically comprises at least one functional layer $F_{RC}$ on the reverse face of the ultrathin lens $R_{DC}$. The functional layer $F_{RC}$ may be at least one antireflection layer, at least one antifog layer or at least one clean-coat layer. Typically, the functional layer $F_{RC}$ comprises at least one antireflection layer and at least one clean-coat layer, in which case the clean-coat layer is the outermost layer on the eye side of the spectacle lens of the disclosure. The above layers have already been described in detail in connection with the ultrathin lens of component A.

The front face and/or the reverse face of the ultrathin lens of component A or component C can each be coated by means of a PVD method and/or a spin-coating method. The subsequent curing of the coating obtained by the spin-coating method can be effected either thermally or by radiation curing. Typically, this coating is cured by radiation curing.

If the spectacle lenses of the disclosure comprise adjoining functional layers, it will be apparent to the person skilled in the art that these must be compatible with one another in order, for example, to prevent separation of the spectacle lens of the disclosure.

Component C of the spectacle lens of the disclosure may, additionally or alternatively to an ultrathin lens, comprise at least one functional layer $F_C$. In the absence of an ultrathin lens, the functional layer $F_C$ of component C is typically selected from the group consisting of at least one hard lacquer layer, typically a composition for the production of a coating having high bond strength and high scratch resistance, as described, for example, in EP 2 578 649 A1, especially in EP 2 578 649 A1, claim 1, at least one antireflection layer, at least one antifog layer, at least one clean-coat layer and at least one electrically conductive or semiconductive layer. Proceeding from the reverse face $R_B$ of the finished spectacle lens of component B, in the presence of multiple functional layers $F_C$, the coating sequence in the eye direction is as follows:

a) optionally at least one electrically conductive or semiconductive layer,
b) at least one antireflection layer,
c) at least one antifog layer or at least one clean-coat layer.

In this case, the electrically conductive or semiconductive layer optionally present as functional layer $F_C$ may be a constituent of the antireflection layer.

In one exemplary embodiment of the disclosure, the spectacle lenses of the disclosure do not comprise any component B, but only comprise components A and C. In this exemplary embodiment, the spectacle lenses of the disclosure typically comprise an ultrathin lens as each of components A and C, where the ultrathin lens of component A and the ultrathin lens of component C are typically identical in relation to glass composition and shape. In this exemplary embodiment too, the front face of the ultrathin lens $V_{DA}$ of component A has typically been coated with at least one functional layer $F_{VA}$, and the reverse face of the ultrathin lens $R_{DA}$ of component A optionally with at least one functional layer $F_{RA}$. The front face of the ultrathin lens $V_{DC}$ of component C has optionally been coated with at least one functional layer $F_{VC}$, and the reverse face of the ultrathin lens $R_{DC}$ of component C typically with at least one functional layer $F_{RC}$. The functional layer $F_{RA}$ of the reverse face of the ultrathin lens $R_{DA}$ of component A or the functional layer $F_{VC}$ of the front face of the ultrathin lens $V_{DC}$ of component C may be selected from the group consisting of at least one coloring layer, at least one photochromic layer, at least one polarizing layer and/or at least one reflection layer. In this exemplary embodiment, not all functional layers disposed between components A and C in the spectacle lens of the disclosure need be present as at least one functional layer $F_{RA}$ on the reverse face $R_{DA}$ of component A or as at least one functional layer $F_{VC}$ on the front face $V_{DC}$ of component C. The reverse face $R_{DA}$ of the ultrathin lens of component A and the front face $F_{VC}$ of the ultrathin lens of component C may, for example, each include some of the functional layers present in the spectacle lens of the disclosure comprising components A and C. For example, the functional layer $F_{RA}$ may comprise a photochromic layer and the functional layer $F_{VC}$ a polarizing layer. The at least one functional layer $F_{VA}$ on the front face of the ultrathin lens $V_{DA}$ of component A or the at least one functional layer $F_{RC}$ on the reverse face of the ultrathin lens $R_{DC}$ of component C may be at least one antireflection layer, at least one antifog layer, at least one electrically conductive or semiconductive layer and/or at least one clean-coat layer. It is preferable in this exemplary embodiment that the functional layer $F_{VA}$ on the front face of the ultrathin lens $V_{DA}$ of component A and the functional layer $F_{RC}$ on the reverse face of the ultrathin lens $R_{DC}$ of component C in each case comprise an antireflection layer and, as the respective outermost layer on the object side or eye side, a clean-coat layer. In this exemplary embodiment, components A and C are typically bonded to one another in a cohesive and form-fitting manner. In order to assure an increase in mechanical stability and/or to take account of different radii of curvature of the ultrathin lenses of components A and C, in this exemplary embodiment, an adhesive may be added between components A and C. With regard to the different radii of curvature of components A and C, the details given above are applicable, i.e., the radii of curvature should differ by less than 1 mm, further typically within a range from 0.03 mm to ≤0.8 mm, more typically within a range from 0.04 mm to ≤0.7 mm and most typically within a range from 0.05 mm to ≤0.6 mm. In addition, different surface topographies of the ultrathin lenses of components A and C or of the functional layers $F_{RA}$ or $F_{VC}$ optionally present thereon may be filled by means of an adhesive. The surface topography of the functional layers $F_{RA}$ or $F_{VC}$ is typically matched to the surface topography of the reverse face of the ultrathin lens $R_{DA}$ of component A or the front face of the ultrathin lens $V_{DC}$ of component C.

Component B of the spectacle lens of the disclosure comprises at least one polymeric material and/or at least one mineral glass.

In one exemplary embodiment of the disclosure, component B comprises at least one polymeric material or at least one mineral glass, where the polymeric material or the mineral glass may each take the form of a semifinished spectacle lens or of a finished spectacle lens. In a further exemplary embodiment, the polymeric material of component B may comprise a polymer film. Semifinished spectacle lenses or finished spectacle lenses may be based, for example, on the base materials specified in table 1 below.

TABLE 1

Examples of base materials for semifinished spectacle lenses or finished spectacle lenses

| Trade name | Base material | Average refractive index n* | Abbe number v* |
|---|---|---|---|
| CR 39, CR 330, CR 607, CR 630, RAV 700, 7NG, 7AT, 710, 713, 720 | Polyallyldiglycol carbonate ((P)ADC) | 1.500 | 56 |
| RAVolution | Polyurea/Polyurethane | 1.500 | 54 |
| Trivex | Polyurea/Polyurethane | 1.530 | 45 |
| Panlite, Lexan | Polycarbonate (PC) | 1.590 | 29 |
| MR 6 | Polythiourethane | 1.598 | |
| MR 8 | Polythiourethane | 1.598 | 41 |
| MR 7 | Polythiourethane | 1.664 | 32 |
| MR 10 | Polythiourethane | 1.666 | 32 |
| MR 174 | Polyepisulfide | 1.738 | 32 |
| MGC 1.76 | Polyepisulfide | 1.76 | 30 |
| | Mineral 1.5 | 1.525 | 58 |
| | Mineral 1.6 | 1.604 | 44 |

*Based on sodium D line

For production of a spectacle lens of the disclosure comprising components A, B, and C, in this exemplary embodiment, the reverse face of the ultrathin lens $R_{DA}$ of component A is joined to the front face $V_B$ of component B. If component C comprises an ultrathin lens, the reverse face $R_B$ of component B is joined to the front face of the ultrathin lens $V_{DC}$ of component C. Alternatively, if component C comprises at least one functional layer $F_C$, the reverse face $R_B$ of component B is coated therewith. In the absence of component B, the reverse face of the ultrathin lens $R_{DA}$ of component A is joined to the front face of the ultrathin lens $V_{DC}$ of component C.

The individual components of the spectacle lens of the disclosure are joined, for example, by means of an adhesive or a bonding method. Typically, the individual components of the spectacle lens of the disclosure are joined by means of an adhesive. The adhesive may serve here, for example, as primer or compensation material for the different thermal expansion of the individual components. In addition, via the selection of the adhesive, matching of any difference in refractive index $\Delta n_D$ that exists between the individual components can be achieved. What is typically effected here is not just the matching of the refractive index $n_D$ but also the matching of the Abbe number, such that the change in the refractive index of the individual components is the same across the visible spectrum. The adhesive usable in the spectacle lens of the disclosure can be found, for example, in DE 10 2012 210 185 A1, WO 2009/056196 A1 or WO 2015/121341 A1. Typically, the individual components of the spectacle lens of the disclosure are bonded to one another by means of an adhesive based on an amine-catalyzed thiol hardening of epoxy resins analogously to WO 2015/121341 A1, especially analogously to claim 1 of WO 2015/121341 A1, at a temperature from a range from 20° C. to 80° C., typically from a range from 40° C. to 70° C. and more typically from a range from 45° C. to 65° C.

In one exemplary embodiment of the disclosure, components A, B, and C, if component C is an ultrathin lens, have the same diameter prior to joining by means of an adhesive.

The surface topography of a functional layer is typically matched to the surface topography of the front face or reverse face that has been respectively coated therewith of one of the components of the spectacle lens of the disclosure. "Matched" is understood here to mean that the two surface topographies are essentially the same or the differences are so small that they can be filled with one of the adhesives listed above.

It will also be apparent to the person skilled in the art in this connection that the functional layer(s) optionally present in each case at the interfaces between components A and B or B and C of the spectacle lens of the disclosure should be taken into account as well in the selection of a suitable adhesive.

If a spectacle lens comprising components A, B, and C is produced using a semifinished spectacle lens as component B, the optically effective target face of the semifinished spectacle lens is typically bondable in a cohesive and form-fitting manner either to the reverse face of the ultrathin lens of component A or optionally to the front face of the ultrathin lens of component C. Possible surface topographies of an optically effective target surface of the front face $V_B$ or of the reverse face $R_B$ of component B and the respectively fitting surface topographies of the ultrathin lenses of components A and C, if component C comprises an ultrathin lens, can be found in table 2. In this exemplary embodiment, the opposite face from the optically effective target face of the semifinished spectacle lens may first likewise be converted to an optically effective target face and the resulting component B may be bonded, in each case typically in a cohesive and/or form-fitting manner, to the ultrathin lens of component A and optionally of component C. Rather than the ultrathin lens of component C, the reverse face of component B can also be coated with a functional layer $F_C$. Typically, in the case of use of a semifinished spectacle lens, the front face $V_B$ of component B is the optically effective target face. An alternative mode of production of the spectacle lens of the disclosure by means of a semifinished spectacle lens comprises the typically cohesive and/or form-fitting bonding of the optically effective target face of the semifinished spectacle lens to one of the ultrathin lenses of components A and C. Preference is given here to bonding the optically effective front face $V_B$ of the semifinished spectacle lens of component B to the reverse face $R_{DA}$ of the ultrathin lens of component A in a cohesive and form-fitting manner. This composite permits, for the processing of the reverse face $R_B$, a low minimum thickness of component B without impairing the stability thereof. After processing of the reverse face has ended, this can either be bonded to the front face of the ultrathin lens $V_{DC}$ of component C, typically in a cohesive and/or form-fitting manner, or coated with a functional layer $F_C$. The typically cohesive and/or form-fitting bonding can be effected by means of an adhesive, by means of a bonding method or by means of contact bonding. Preference is given to the bonding of the individual components by means of an adhesive. Small differences in surface topography and/or different thermal expansion can be filled or compensated for by means of an adhesive. Typically, a spectacle lens of the disclosure is produced with the aid of a semifinished spectacle lens via the last method presented. It is of course possible for the individual components of the spectacle lens of the disclosure to be covered by at least one of the functional layers already described in detail prior to the joining. The separate coating or separate preparation of the individual components has the advantage that the process conditions can be optimally tailored to the respective component. If the spectacle lens of the disclosure comprises further components, the above remarks in relation to components A, B, and C are correspondingly applicable.

Table 2 below gives, by way of example, an overview of the possible surface topographies of the front faces or of the reverse faces of components A, B, and C of the spectacle lens of the disclosure if component C comprises an ultrathin lens and component B a finished spectacle lens. Table 2 does not distinguish between the front face and reverse face of the respective ultrathin lens of component A or C since the differences in surface topography caused by any preceding forming process are typically negligible. Moreover, the illustrative overview of surface topographies does not make separate mention of functional layers that are optionally present since the individual functional layers are typically matched to the surface topography of the component respectively coated therewith and hence are typically likewise negligible in this connection.

TABLE 2

Possible surface topographies of components A, B, and C

| Component A | Component B, front face $V_B$ | Component B, reverse face $R_B$ | Component C |
|---|---|---|---|
| spherical[1] | spherical | spherical | spherical |
| spherical | spherical | planar | planar |
| planar | planar | spherical | spherical |
| planar | planar | planar | planar |
| aspherical[1] | aspherical | aspherical | aspherical |
| aspherical | aspherical | planar | planar |
| planar | planar | aspherical | aspherical |
| spherical | spherical | aspherical | aspherical |
| aspherical | aspherical | spherical | spherical |
| spherical | spherical | toric[1] | toric |
| toric | toric | spherical | spherical |
| toric | toric | toric | toric |
| aspherical | aspherical | toric | toric |
| toric | toric | aspherical | aspherical |
| toric | toric | planar | planar |
| planar | planar | toric | toric |
| spherical | spherical | atoric[1] | atoric |
| atoric | atoric | spherical | spherical |
| atoric | atoric | atoric | atoric |
| aspherical | aspherical | atoric | atoric |
| atoric | atoric | aspherical | aspherical |
| atoric | atoric | planar | planar |
| planar | planar | atoric | atoric |
| toric | toric | atoric | atoric |
| atoric | atoric | toric | toric |

A spherical, aspherical, toric or atoric surface topography may in each case have a convex or concave configuration. When the individual components of the spectacle lens of the disclosure are joined, typically in each case exclusively concave or in each case exclusively convex components are used.

In one exemplary embodiment of the disclosure, as apparent from table 2 above, if component C comprises an ultrathin lens and component B a finished spectacle lens, the surface topography at the respective interface of component A to B or B to C may be mutually fitting, such that the individual components of the spectacle lens of the disclosure are typically bondable to one another in a cohesive and/or form-fitting manner. "Mutually fitting" means here that the respective interfaces can be joined with an exact fit or that slight differences in surface topography can be filled by means of an adhesive. The surface topography of the ultrathin lens of components A and C may be the same or different.

In one exemplary embodiment of the disclosure, the front faces and the reverse faces of components A, B, and C of the spectacle lens of the disclosure may each have an identical surface topography as listed by way of example in table 2. If the front faces and the reverse faces of components A, B, and C are each in spherical form, for example, these may each have identical radii of curvature and diameters, such that components A and B and components B and C can each be joined in a cohesive and form-fitting manner, for example by means of an adhesive, a bonding method or by contact bonding. Preference is given to the joining of the individual components of the spectacle lens of the disclosure by means of an adhesive, more typically by means of an adhesive based on amine-catalyzed thiol hardening of epoxy resins to WO 2015/121341 A1. If the front faces and the reverse faces of components A, B, and C are each in spherical form but do not have identical radii of curvature at the interface between components A and B and/or at the interface between components B and C, the cavities that result from the differences in curvature on joining of the individual components are typically filled by means of an adhesive. For filling of cavities as well, preference is given to using an adhesive based on amine-catalyzed thiol hardening of epoxy resins according to WO 2015/121341 A1. Typically, nonidentical radii of curvature of the individual components differ by less than 1 mm, further typically within a range from 0.03 mm to ≤0.8 mm, more typically within a range from 0.04 mm to ≤0.7 mm and most typically within a range from 0.05 mm to ≤0.6 mm. Slight deviations in the radii of curvature can be exploited in that any air pockets that occur in the adhesive during the joining can be removed by simple pressing of the ultrathin lens of component A and/or C in the direction of the cylinder edge face of the semifinished spectacle lens or finished spectacle lens of component B. If the interfaces of components A, B, and C are each in planar form, these may likewise be joined in a cohesive and form-fitting manner, for example by means of an adhesive or a bonding method.

In a further exemplary embodiment of the disclosure, the spectacle lenses of the disclosure may have either no dioptric power or at least one dioptric power implemented in the finished spectacle lens, optionally including the ultrathin lens of component A or the ultrathin lenses of components A and C. Spectacle lenses of the disclosure having above-described surface topographies and simultaneously at least one dioptric power, i.e., in the form of a monofocal spectacle lens or of a multifocal spectacle lens, can also be implemented, for example, by means of a component B having a calculated location-dependent refractive index distribution.

In one exemplary embodiment of the disclosure, at least components A, B, and C, if component C is an ultrathin lens, of the spectacle lens of the disclosure can be joined by means of a bonding method. The bonding method can be employed alternatively or additionally to an adhesive or to the contact bonding for joining of the individual components of the spectacle lens of the disclosure. One way of using the bonding method is in connection with semifinished spectacle lenses and finished spectacle lenses as component B. Alternatively, it is also possible to use multiple methods for joining of a spectacle lens of the disclosure. For example, components A and B can be joined by means of a bonding method, and components B and C by means of an adhesive. In the bonding method, at least one side of the finished spectacle lens or the optically effective target face of the semifinished spectacle lens is employed for shaping of the ultrathin lens which is to be bonded to precisely that shaping face. For this purpose, the ultrathin lens of component A or the ultrathin lens of component C is heated typically up to the transformation temperature $T_G$ of the respective ultrathin lens, typically under a protective gas atmosphere, and contacted with the front face or reverse face of component B to be bonded in each case, for example by pressing the front face of the reverse face of component B into the heated ultrathin lens. Component B serves here firstly as mold shell for forming of the ultrathin lens; secondly, there is no need to use an adhesive in the bonding method. When the bonding method is used, it is obvious to the person skilled in the art that the process conditions for semifinished spectacle lenses or finished spectacle lenses of component B based on mineral glass and semifinished spectacle lenses or finished spectacle lenses of component B based on organic minerals have to be appropriately matched. Semifinished spectacle lenses or finished spectacle lenses of component B based on mineral glass may have a higher transformation temperature $T_G$ than the ultrathin lens of components A and optionally C to be bonded, and so, in the bonding method, less attention has to be paid here to the thermal stability of the at least one optically effective target face of component B itself than to optionally at least one functional layer applied to component B, and hence the process conditions have to be adjusted appropriately. Semifinished spectacle lenses or finished spectacle lenses of component B based on organic materials generally have a much lower transformation temperature $T_G$ than the ultrathin lens of component A and optionally of component C to be bonded. In this case, the bonding method has to be matched both to the thermal stability of component B and to the thermal stability of a coating optionally present on component B. This can be achieved, for example, by keeping the thermal stress on component B to a minimum by subjecting component B to a region that serves for heating of the ultrathin lens, for example an oven, for a very short period, typically less than 5 seconds, more typically less than 2 seconds. This brief thermal stress on component B does not bring about any change in the optically effective target face since the heat capacity of the ultrathin lens, in view of its small mass, is low compared to the mass of component B. Thermally sensitive functional layers of component B can be protected, for example, with a more thermally stable protective layer. This may involve, for example, a coating composition as disclosed, for example, in EP 2 578 649 A1, especially in EP 2 578 649 A1, claim 1, or a metal oxide, metal hydroxide and/or metal oxide hydrate layer. The protective layer may also serve as a primer to compensate for differences in expansion.

The above remarks relating to the joining of components A, B, and C with a finished spectacle lens as component B may be applied correspondingly to the presence of further components in the spectacle lens of the disclosure.

In a further exemplary embodiment, the ultrathin lenses of components A and C may be contact-bonded to a finished spectacle lens by simply bringing them together. In this way, a stable bond can be achieved without adhesive or prior heating. A prerequisite for this is that the ultrathin lenses of components A and C and the finished spectacle lens of component B have an identical radius of curvature. In this connection, an identical radius of curvature tolerates differences in the sub-millimeter range.

In one exemplary embodiment of the disclosure, the semifinished spectacle lens or the finished spectacle lens of component B may be in colored (cf. dyes described in the chapters about colorable layer) or uncolored form. In addition, the semifinished spectacle lens or the finished spectacle lens of component B may comprise, for example, a polarizing film.

In a typical exemplary embodiment of the disclosure, the semifinished spectacle lens or the finished spectacle lens of component B is uncolored.

In a further typical exemplary embodiment, the semifinished spectacle lens of component B comprises at least one functional layer on the optically effective target face and the finished spectacle lens of component B comprises at least one functional layer $F_{V_B}$ on the front face $V_B$ and at least one functional layer $F_{RB}$ on the reverse face $R_B$. Depending on the optically effective target face of the semifinished spectacle lens, the respective functional layer may be the layers specified for the finished spectacle lens hereinafter. The at least one functional layer $F_{VB}$ used may be any of those functional layers $F_{RA}$ that can be used on the reverse face $R_{DA}$ of the ultrathin lens of component A, meaning that the functional layer $F_{VB}$ may be selected from the group consisting of coloring layer, photochromic layer, polarizing layer and reflection layer. The functional layers $F_{RA}$ have already been described in detail above. In relation to the typical layer sequence between components A and B of the spectacle lens of the disclosure as well, the statements already made above are applicable. If the front face $V_B$ of the semifinished spectacle lens or of the finished spectacle lens has been coated with at least one functional layer $F_{VB}$, one possible exemplary embodiment is that the reverse face $R_{DA}$ of the ultrathin lens of component A does not have a functional layer $F_{RA}$, or the front face $V_B$ and the reverse face $R_{DA}$ may each include some of the functional layers present between components A and B in the spectacle lens of the disclosure. If the semifinished spectacle lens or the finished spectacle lens of component B is based on an organic material, coating of the reverse face $R_{DA}$ of the ultrathin lens of component A holds the particular advantage that the coating conditions for the ultrathin lens can be optimized without having to take account of the more thermally sensitive organic material. By contrast, the coating of the front face $V_B$ of the semifinished spectacle lens or of the finished spectacle lens of component B with at least one functional layer $F_{VB}$ has the advantage that it is possible to use conventional standard coating processes for spectacle lenses based on polymeric materials in conventional standard coating systems without having to take special precautions for the more fracture-sensitive ultrathin lens of component A. The at least one functional layer $F_{RB}$ on the reverse face $R_B$ of the finished spectacle lens of component B, just like the functional layer $F_{VC}$ for coating of the front face $V_{DC}$ of the ultrathin lens of component C, may be a coloring layer. In the case of the at least one functional layer present between components B and C in the spectacle lens of the disclosure as well, it is possible to coat either the reverse face $R_B$ of the finished spectacle lens of component B or the front face $V_{DC}$ of the ultrathin lens of component C. The considerations made above in connection with the coating between components A and C of the spectacle lens of the disclosure are also applicable here to the selection of the component to be coated. If the spectacle lens of the disclosure does not comprise any ultrathin lens as component C, the reverse face $R_B$ of the finished spectacle lens may alternatively also be coated with at least one functional layer $F_C$ as component C. The functional layer $F_C$ of component C may be selected, for example, from the group consisting of at least one composition for the production of a coating having high bond strength and high scratch resistance, as described, for example, in EP 2 578 649 A1, especially in claim 1 of EP 2 578 649 A1, at least one antireflection layer, at least one antifog layer, at least one clean-coat layer and at least one electrically conductive or semiconductive layer. Proceeding from the reverse face $R_B$ of the finished spectacle lens of component B, in the presence of multiple layers, the coating sequence in the eye direction is as follows:

a) optionally at least one electrically conductive or semiconductive layer, b) at least one antireflection layer, c) at least one antifog layer or at least one clean-coat layer.

The electrically conductive or semiconductive layer optionally present as functional layer $F_C$ may be a constituent of the antireflection layer.

In a typical exemplary embodiment of the disclosure, in the production of a spectacle lens of the disclosure comprising at least components A, B, and C using a semifinished spectacle lens or a finished spectacle lens as component B, the latter is coated on the front face $V_B$ and/or on the reverse face $R_B$. This component B is then joined to an ultrathin lens of component A uncoated on the reverse face $R_{DA}$ and optionally to an ultrathin lens of component C uncoated on the front face $V_{DA}$. Alternatively, the reverse face $R_B$ of the semifinished spectacle lens, if it is optically effective, or the reverse face $R_B$ of the finished spectacle lens may be coated with at least one functional layer $F_C$. Useful functional layers $F_C$ here typically include the above-described layers in the sequence specified there. If components A and C of the spectacle lens of the disclosure are each an ultrathin lens, the front face $V_{DA}$ of the ultrathin lens of component A and reverse face $R_{DC}$ of the ultrathin lens of component C may each be covered with at least one functional layer $F_{VA}$ or $F_{RC}$. The functional layer $F_{VA}$ or the functional layer $F_{RC}$ may in each case be from the group consisting of at least one antireflection layer, at least one antifog layer, at least one electrically conductive or semiconductive layer and at least one clean-coat layer. Proceeding from the front face $V_{DA}$ of the ultrathin lens of component A in the object direction or proceeding from the reverse face $R_{DC}$ of the ultrathin lens of component C in the eye direction, the coating sequence is typically in each case as follows:

a) optionally at least one electrically conductive or semiconductive layer, b) at least one antireflection layer, and c) at least one antifog layer or at least one clean-coat layer.

The optionally present electrically conductive or semiconductive layer may be present as a constituent of the antireflection layer. The at least one functional layer $F_{VA}$ and the at least one functional layer $F_{RC}$ may each be identical, but need not be, meaning that the front face $V_{DA}$ of the ultrathin lens of component A and the reverse face $R_{DC}$ of the ultrathin lens of component C may be covered with different functional layers. Typically, the at least one functional layer $F_{VA}$ on the front face $V_{DA}$ of the ultrathin lens of component A and the at least one functional layer $F_{RC}$ on the reverse face $R_{DC}$ of the ultrathin lens of component C and, in the respective presence of multiple functional layers, the respective sequence thereof proceeding from the respective surface of the ultrathin lens are identical. Alternatively, the front face $V_{DA}$ of the ultrathin lens of component A and/or the reverse face $R_{DC}$ of the ultrathin lens of component C may have been provided with at least one antireflection layer, where the antireflection layers may be of identical or different construction.

As an alternative to the use of a semifinished spectacle lens or finished spectacle lens as component B, component B of the spectacle lens of the disclosure may be produced with the aid of a casting method. For this purpose, the ultrathin lens of component A, optionally after forming of the ultrathin lens, may be mounted on a front-face mold shell and/or a reverse-face mold shell of a casting mold. The mold shell used in each case typically has an identical radius of curvature to the ultrathin lens of component A mounted in the mold shell. The casting mold used in the casting method for production of component B is typically the casting mold described in DE 10 2013 222 232 A1, especially the casting mold disclosed in DE 10 2013 222 232 A1, FIG. 16. In the casting method, it is the reverse face $R_{DA}$ of the ultrathin lens of component A that determines the surface topography of the front face $V_B$ of component B. The mold shell is typically matched to the surface topography of the front face $V_{DA}$ of the ultrathin lens of component A, such that component A defines the optically effective front face of a spectacle lens of the disclosure comprising at least components A, B, and C. Owing to the small average thickness of the ultrathin lens of component A, the surface topographies of the front face $V_{DA}$ and of the reverse face $R_{DA}$ are typically identical. The ultrathin lens is fixed to the mold shell typically by means of reduced pressure. For this purpose, for example, corresponding vacuum ducts and vacuum connections should be provided in the mold shell, by means of which the reduced pressure can be built up by means of annular and connecting ducts and maintained by means of a valve. Alternatively, the mold shell may be executed by means of sintering methods from stainless steel or ceramic, for example, where the porosity of these materials can be exploited for full-area application of a vacuum. If this exemplary embodiment of the mold shell is chosen, all surfaces facing the atmosphere should previously have been sealed with a lacquer, for example. The ultrathin lens of component A typically has the same diameter as the mold shell. The diameter here is typically within a range from 40 mm to 150 mm, more typically within a range from 55 mm to 135 mm and most typically within a range from 70 mm to 100 mm. The combination of mold shell and ultrathin lens of component A that has been fixed by means of reduced pressure is typically inserted into a step sealing ring or a membrane sealing ring. The casting mold may have, for example, the following mold shell constituents, viewed in each case from the front face to the reverse face of the resulting spectacle lens of the disclosure:

1. vacuum mold shell/ultrathin lens of component A/sealing ring/conventional mold shell;
2. vacuum mold shell/ultrathin lens of component A/sealing ring—ultrathin lens of component C/vacuum mold shell;
3. conventional mold shell/sealing ring/ultrathin lens of component A/vacuum mold shell.

Typically, the casting mold comprises the constituents according to the first variant detailed above.

In the casting method, the monomer mixture required for production of component B is poured directly onto the reverse face $R_{DA}$ of the ultrathin lens of component A that has optionally been provided with at least one functional layer $F_{RA}$. Typically, only a small amount of separating agent, if any, is added to this monomer mixture, for example organic phosphonates or phosphoric esters, so as to result in a mechanically inextricable bond between the reverse face $R_{DA}$ of the ultrathin lens of component A and the front face $V_B$ of component B. In order to prevent a mechanically inextricable bond from also resulting between the reverse face $R_B$ component B and the further mold face, the further mold shell is typically provided, prior to the assembly to form a casting mold, with a protective coating, for example a protective film or a protective lacquer (for example Illmar P4 optics lacquer, M-Lack 10 optics lacquer, PBJ 2002 protective lacquer, TLS blue/2002 protective lacquer, from Pieplow & Brand) on the side facing the component B to be cast. This protective layer may optionally be removed from the reverse face $R_B$ of component B in a downstream process step, for example in the machining, turning and/or polishing thereof. It is likewise also unnecessary when using a membrane sealing ring for the spectacle lens comprising components A and B that results after the casting process to be detached therefrom since the membrane sealing ring can be removed by processing in a downstream Rx manufacturing step. The above-described casting method is suitable in principle for all monomer mixtures from which it is possible to produce, inter alia, a polyallyldiglycol carbonate, polyurethane (e.g. Trivex), polyurea (e.g. RAVolution), polythiourethane (e.g. MR-7/MR-8/MR-10) or polyepi sulfide (e.g. MR174).

In the case of thermoplastic polymers that are processed by injection molding, the casting method for production of component B has to be adapted. In this case, typically, the injection mold is equipped with an additional vacuum connection on the face on which the ultrathin lens of component A is to be applied. Prior to the closing of the injection mold, the ultrathin lens is fixed by reduced pressure. This adaptation of the casting method is an option especially for systems based on polymethylmethacrylates, polycarbonates or cycloolefin copolymers.

In a further exemplary embodiment of the disclosure, component B of a spectacle lens of the disclosure comprising at least components A, B, and C can be produced by means of a printing method, especially 3D printing method. In this exemplary embodiment, the reverse face $R_{DA}$ of the ultrathin lens of component A that has optionally been coated with at least one functional layer $F_{RA}$ can serve as printing substrate. If component C comprises an ultrathin lens, it is alternatively also possible to employ its front face $V_{DC}$ optionally covered with at least one functional layer $F_{VC}$ as printing substrate. Typically, component B of a spectacle lens of the disclosure is constructed by means of a printing method, especially 3D printing method, by printing on the reverse face $R_{DA}$ of the ultrathin lens of component A that has optionally been coated with at least one functional layer $F_{RA}$. The surface topography of that face of component B which is not predetermined by the ultrathin lens but is opposite to that face can be built up in a controlled manner by means of a printing method, especially 3D printing method. The 3D printing method is an additive manufacturing method in which the desired surface topography of one of the faces of component B is produced exclusively by material application. The three-dimensional shape of component B of the spectacle lens of the disclosure that is to be printed, which can also take account of individualized aspects, for example the diameter, the radius of curvature, or individual prescription values, for example a progression face with defined progression value and course of the progression channel, is first cut digitally into two-dimensional horizontal slices. It is of course also necessary here to take account of the effect of the ultrathin lens of component A and, if component C comprises an ultrathin lens, also the effect of the ultrathin lens of component C. It should also be taken into account that any unwanted defects present in the printing surface of the ultrathin lens are typically first compensated for with at least one printed slice. The information relating to the individual two-dimensional slices to be printed one on top of another is provided to the printer, especially 3D printer, and component B of the spectacle lens of the disclosure is thus constructed from the sum total of the individual two-dimensional slices. A slice to be printed comprises the adjacent arrangement of volume elements—i.e., the adjacent arrangement of printing ink, typically 3D printing ink, after release from a printhead, typically from a printhead suitable for 3D printing—in an area, where the dimensions of the volume elements depend on factors including the diameter of the printhead nozzles. The smallest possible volume element corresponds to the volume of a drop of printing ink, typically 3D printing ink. It is possible to arrange multiple slices of adjacently arranged volume elements one on top of another, i.e., print them one on top of another. The two-dimensional extent and the number of slices to be printed one on top of another depends on the desired dimensions of component B of the spectacle lens of the disclosure to be printed. The individual slices can be cured in slices, typically by means of UV light, until reaction of the radiation-curable component is complete. Alternatively, the printing of each slice may be followed by incomplete curing, and the printing of all slices may be followed by final curing, typically by means of UV light in each case.

The printer, especially 3D printer, comprises at least one printhead which, by the drop-on-demand method known from inkjet printing, produces volume elements by means of a piezoelectric element and only ever positions a volume element exactly at the position where it is required. The at least one printhead can move across the ultrathin lens of component A or of component C and/or the ultrathin lens of component A or of component C may move beneath the at least one printhead. Typically, the 3D printing method used is multijet modeling or the polyjet method. The printhead used may, for example, be the Xaar 1001 printhead (from Xaar), one of the Spectra S-Class, Spectra SE3, Spectra SX3, Spectra Q-class printheads (from Spectra), the KM512 printhead (from Konica Minolta) and/or the 256Jet S4 printhead (from Trident). The resolution of the printhead is typically at least 300×300 dpi, further typically at least 600×600 dpi and more typically at least 1200×1200 dpi. Typically, at least one UV light source is mounted on at least one side of the printhead used; more typically, at least one UV light source is mounted on at least two sides of the printhead used. Alternatively, multiple printheads in parallel can be installed in a 3D printer and selectively actuated. The UV light source may then consist of multiple UV light sources likewise connected in parallel, or of few large UV light sources.

Component B of the spectacle lens of the disclosure that has been produced by means of a printing method, especially 3D printing method, may require at least one further mechanical processing step, for example polishing. Typically, component B of the spectacle lens of the disclosure that has been produced by means of a printing method, especially 3D printing method, does not require any further mechanical processing step, for example machining and/or grinding and/or turning and/or polishing.

For the slice-by-slice construction of component B of the spectacle lens of the disclosure, preference is given to using a printing ink usable in a 3D printing method. "Slice-by-slice construction" comprises successive deposition of the printing ink, typically 3D printing ink. The successive deposition can be effected here adjacently in an area or in a vertically superposed manner. If, for example, a first deposition of the printing ink, typically 3D printing ink, is effected in an area on the ultrathin lens of component A or C, a further slice can be printed over the complete area of the first deposition or part of the area of the first deposition. Typically, the successive deposition of the printing ink, typically 3D printing ink, is first effected adjacently in an area before being followed by further successive deposition of the printing ink, typically 3D printing ink, in the slice above.

The printing ink, especially 3D printing ink, typically comprises at least one radiation-curable component, optionally at least one colorant, optionally at least one UV initiator, optionally at least one solvent and optionally at least one additive.

The radiation-curable component of the printing ink, especially 3D printing ink, typically UV-curable component, typically comprises (meth)acrylate monomers, epoxy monomers, vinyl monomers and allyl monomers, more typically (meth)acrylate monomers. The (meth)acrylate monomers may typically be monofunctional, difunctional, trifunctional and/or tetrafunctional (meth)acrylate monomers. The epoxy monomers may typically be monofunctional, difunctional, trifunctional and/or tetrafunctional epoxy monomers. The vinyl monomers and allyl monomers may typically be monofunctional, difunctional, trifunctional and/or tetrafunctional vinyl monomers and allyl monomers.

In one exemplary embodiment, the monofunctional (meth)acrylate monomers, epoxy monomers, vinyl monomers and allyl monomers usable as radiation-curable component, typically UV-curable component, typically have a viscosity from a range from 0.5 mPa·s to 30.0 mPa·s, more typically from a range from 1.0 mPa·s to 25.0 mPa·s and most typically from a range from 1.5 mPa·s to 20.0 mPa·s.

In one exemplary embodiment, the difunctional (meth) acrylate monomers, epoxy monomers, vinyl monomers and allyl monomers usable as radiation-curable component, typically UV-curable component, typically have a viscosity from a range from 1.5 mPa·s to 17.0 mPa·s, more typically from a range from 2.5 mPa·s to 14.0 mPa·s and most typically from a range from 3.0 mPa·s to 11.0 mPa·s.

In one exemplary embodiment, the trifunctional (meth) acrylate monomers, epoxy monomers, vinyl monomers and allyl monomers usable as radiation-curable component, typically UV-curable component, typically have a viscosity from a range from 20.0 mPa·s to 110.0 mPa·s, more typically from a range from 22.0 mPa·s to 90.0 mPa·s and most typically from a range from 24.0 mPa·s to 83.0 mPa·s.

In one exemplary embodiment, the tetrafunctional (meth) acrylate monomers, epoxy monomers, vinyl monomers and allyl monomers usable as radiation-curable component, typically UV-curable component, typically have a viscosity from a range from 60.0 mPa·s to 600.0 mPa·s, more typically from a range from 70.0 mPa·s to 460.0 mPa·s and most typically from a range from 80.0 mPa·s to 270.0 mPa·s.

The viscosity of the (meth)acrylate monomers, epoxy monomers, vinyl monomers and allyl monomers is typically measured in each case with a Malvern C-VOR 150 rheometer with a specified angular velocity of 5.2 rad/sec at 25° C.

The respective (meth)acrylate monomers, epoxy monomers, vinyl monomers and allyl monomers can each be adjusted to the desired viscosity, for example, by addition of at least one solvent.

The viscosity of the printing ink, typically 3D printing ink, usable for construction of component B of the spectacle lens of the disclosure can be adjusted, for example, by mixing different (meth)acrylate monomers, epoxy monomers, vinyl monomers and/or allyl monomers, for example by mixing monofunctional (meth)acrylate monomers, epoxy monomers, vinyl monomers and/or allyl monomers and difunctional (meth)acrylate monomers, epoxy monomers, vinyl monomers and/or allyl monomers and/or trifunctional (meth)acrylate monomers, epoxy monomers, vinyl monomers and/or allyl monomers. Alternatively or additionally to the mixing of different (meth)acrylate monomers, epoxy monomers, vinyl monomers and/or allyl monomers, the viscosity can be adjusted by addition of at least one solvent.

Monofunctional (meth)acrylate monomers used may, for example, be acrylic acid (CAS No. 79-10-7), methacrylic acid (CAS No. 79-41-4), methyl acrylate (CAS No. 96-33-3), methyl methacrylate (CAS No. 80-62-6), ethyl acrylate (CAS No. 140-88-5), ethyl methacrylate (CAS No. 97-63-

2), ethyl 2-ethylacrylate (CAS No. 3070-65-3), (2,2-dimethyl-1,3-dioxolan-4-yl)methyl methacrylate (CAS No. 7098-80-8), 2-phenoxyethyl acrylate (CAS No. 48145-04-6), isobornyl acrylate (CAS No. 5888-33-5), 2-(2-methoxyethoxy)ethyl methacrylate (CAS No. 45103-58-0), 4-acryloylmorpholine (CAS No. 5117-12-4), dodecyl acrylate (CAS No. 2156-97-0), isodecyl acrylate (CAS No. 1330-61-6), decyl acrylate (CAS No. 2156-96-9), n-octyl acrylate (CAS No. 2499-59-4), isooctyl acrylate (CAS No. 29590-42-9), octadecyl acrylate (CAS No. 4813-57-4), tetrahydrofurfuryl acrylate (CAS No. 2399-48-6), 2-(2-ethoxyethoxy)ethyl acrylate (CAS No. 7328-17-8), 4-tert-butylcyclohexyl acrylate (CAS No. 84100-23-2), methoxy poly(ethylene glycol) monoacrylate (CAS No. 32171-39-4), phenoxy polyethylene glycol acrylate (CAS No. 56641-05-5), mono-2-(acryloyloxy)ethyl succinate (CAS No. 50940-49-3), allyl methacrylate (CAS No. 96-05-9) or mixtures thereof.

Monofunctional (meth)acrylate monomers used are typically acrylic acid, methacrylic acid, methyl acrylate, methyl methacrylate, ethyl acrylate, ethyl methacrylate, 2-phenoxyethyl acrylate, dodecyl acrylate or mixtures thereof, more typically methacrylic acid, methyl methacrylate, ethyl methacrylate or mixtures thereof.

Difunctional (meth)acrylate monomers used may, for example, be ethylene glycol diacrylate (CAS No. 2274-11-5), diethylene glycol diacrylate (CAS No. 2274-11-5), triethylene glycol diacrylate (CAS No. 1680-21-3), tetraethylene glycol diacrylate (CAS No. 17831-71-9), ethylene glycol dimethacrylate (CAS No. 97-90-5), diethylene glycol dimethacrylate (CAS No. 2358-84-1), triethylene glycol dimethacrylate (CAS No. 109-16-0), tetraethylene glycol dimethacrylate (CAS No. 109-17-1), polyethylene glycol 200 dimethacrylate (CAS No. 25852-47-2), dipropylene glycol diacrylate (CAS No. 57472-68-1), tripropylene glycol diacrylate (CAS No. 42978-66-5), butane-1,3-diol diacrylate (CAS No. 19485-03-1), butane-1,4-diol diacrylate (CAS No. 1070-70-8), hexane-1,6-diol diacrylate (CAS No. 13048-33-4), neopentyl glycol diacrylate (CAS No. 2223-82-7), butane-1,3-diol dimethacrylate (CAS No. 1189-08-8), butane-1,4-diol dimethacrylate (CAS No. 2082-81-7), hexane-1,6-diol dimethacrylate (CAS No. 6606-59-3) or mixtures thereof.

Difunctional (meth)acrylate monomers used are typically polyethylene glycol 200 dimethacrylate, ethylene glycol dimethacrylate, diethylene glycol dimethacrylate, butane-1,4-diol dimethacrylate or mixtures thereof, more typically ethylene glycol dimethacrylate, diethylene glycol dimethacrylate or mixtures thereof.

Trifunctional (meth)acrylate monomers used may, for example, be trimethylolpropane trimethacrylate (CAS No. 3290-92-4), trimethylolpropane triacrylate (CAS No. 15625-89-5), pentaerythritol triacrylate (CAS No. 3524-68-3), pentaerythritol propoxylate triacrylate (CAS No. 145611-81-0), trimethylolpropane propoxylate triacrylate (CAS No. 53879-54-2), trimethylolpropane ethoxylate triacrylate (CAS No. 28961-43-5) or mixtures thereof.

Trifunctional (meth)acrylate monomers used with preference are trimethylolpropane trimethacrylate, pentaerythritol triacrylate or mixtures thereof, more typically trimethylolpropane trimethacrylate.

Tetrafunctional (meth)acrylate monomers used may, for example, be di(trimethylolpropane) tetraacrylate (CAS No. 94108-97-1), pentaerythritol tetraacrylate (CAS No. 4986-89-4), pentaerythritol tetramethacrylate (CAS No. 3253-41-6) or mixtures thereof.

Tetrafunctional (meth)acrylate monomers used are typically di(trimethylolpropane) tetraacrylate, pentaerythritol tetramethacrylate or mixtures thereof, more typically di(trimethylolpropane) tetraacrylate.

Monofunctional epoxy monomers used may, for example, be ethyl glycidyl ether (CAS No. 4016-11-9), n-butyl glycidyl ether (CAS No. 2426-08-6), 2-ethylhexyl glycidyl ether (CAS No. 2461-15-6), C8-C10 glycidyl ether (CAS No. 68609-96-1), C12-C14 glycidyl ether (CAS No. 68609-97-2), cresyl glycidyl ether (CAS No. 2210-79-9), p-tert-butylphenyl glycidyl ether (CAS No. 3101-60-8), nonylphenyl glycidyl ether (CAS No. 147094-54-0), benzyl glycidyl ether (CAS No. 2930-05-4), phenyl glycidyl ether (CAS No. 122-60-1), bisphenol A 2,3-dihydroxypropyl glycidyl ether (CAS No. 76002-91-0) or mixtures thereof.

Monofunctional epoxy monomers used are typically ethyl glycidyl ether, n-butyl glycidyl ether, 2-ethylhexyl glycidyl ether or mixtures thereof, more typically ethyl glycidyl ether, n-butyl glycidyl ether or mixtures thereof.

Difunctional epoxy monomers used in the printing ink, typically 3D printing ink, usable for construction of component B of the spectacle lens of the disclosure may, for example, be diglycidyl ether (CAS No. 2238-07-5), ethylene glycol diglycidyl ether (CAS No. 2224-15-9), diethylene glycol diglycidyl ether (CAS No. 4206-61-5), propylene glycol diglycidyl ether (CAS No. 16096-30-3), dipropylene glycol diglycidyl ether (CAS No. 41638-13-5), butane-1,4-diol diglycidyl ether (CAS No. 2425-79-8), cyclohexane-1,4-dimethanol diglycidyl ether (CAS No. 14228-73-0), neopentyl glycol diglycidyl ether (CAS No. 17557-23-2), polypropylene glycol (400) diglycidyl ether (CAS No. 26142-30-3), hexane-1,6-diol diglycidyl ether (CAS No. 16096-31-4), bisphenol A diglycidyl ether (CAS No. 1675-54-3), bisphenol A propoxylate diglycidyl ether (CAS No. 106100-55-4), polyethylene glycol diglycidyl ether (CAS No. 72207-80-8), glycerol diglycidyl ether (CAS No. 27043-36-3), resorcinol diglycidyl ether (CAS No. 101-90-6) or mixtures thereof.

Difunctional epoxy monomers used are typically diglycidyl ether, ethylene glycol diglycidyl ether, diethylene glycol diglycidyl ether, butane-1,4-diol diglycidyl ether, polyethylene glycol diglycidyl ether, polypropylene glycol (400) diglycidyl ether or mixtures thereof, more typically ethylene glycol diglycidyl ether, diethylene glycol diglycidyl ether, butane-1,4-diol diglycidyl ether, polyethylene glycol diglycidyl ether or mixtures thereof.

Trifunctional epoxy monomers used may, for example, be trimethylolethane triglycidyl ether (CAS No. 68460-21-9), trimethylolpropane triglycidyl ether (CAS No. 30499-70-8), triphenylolmethane triglycidyl ether (CAS No. 66072-38-6), tris(2,3-epoxypropyl) isocyanurate (CAS No. 2451-62-9), tris(4-hydroxyphenyl)methane triglycidyl ether (CAS No. 66072-38-6), 1,1,1-tris(4-hydroxyphenyl)ethane triglycidyl ether (CAS No. 87093-13-8), glycerol triglycidyl ether (CAS No. 13236-02-7), glycerol propoxylate triglycidyl ether (CAS No. 37237-76-6), N,N-diglycidyl-4-glycidyloxyaniline (CAS No. 5026-74-4) or mixtures thereof.

Trifunctional epoxy monomers used are typically trimethylolpropane triglycidyl ether, tris(2,3-epoxypropyl) isocyanurate, glycerol triglycidyl ether, glycerol propoxylate triglycidyl ether or mixtures thereof, more typically tris(2,3-epoxypropyl) isocyanurate, glycerol triglycidyl ether or mixtures thereof.

Tetrafunctional epoxy monomers used may, for example, be pentaerythritol tetraglycidyl ether (CAS No. 3126-63-4), dipentaerythritol tetraglycidyl ether, tetraglycidylbenzylethane, sorbitol tetraglycidyl ether, tetraglycidyldiaminophenylmethane, tetraglycidylbisamino-methylcyclohexane or mixtures thereof.

Tetrafunctional epoxy monomers used are typically pentaerythritol tetraglycidyl ether (CAS No. 3126-63-4), dipentaerythritol tetraglycidyl ether, sorbitol tetraglycidyl ether or mixtures thereof, more typically pentaerythritol tetraglycidyl ether (CAS No. 3126-63-4), dipentaerythritol tetraglycidyl ether or mixtures thereof.

If the radiation-curable component of the printing ink, typically 3D printing ink, usable for construction of component B comprises monofunctional vinyl monomers, these may be, for example, ethylene glycol vinyl ether (CAS No. 764-48-7), di(ethylene glycol) vinyl ether (CAS No. 929-37-3), 1-vinylcyclohexanol (CAS No. 1940-19-8), vinyl acetate (CAS No. 108-05-4), vinyl chloride (CAS No. 75-01-4), ethyl vinyl ketone (CAS No. 1629-58-9), butyl vinyl ether (CAS No. 111-34-2), butane-1,4-diol vinyl ether (CAS No. 17832-28-9), vinyl acrylate (CAS No. 2177-18-6), vinyl methacrylate (CAS No. 4245-37-8), isobutyl vinyl ether (CAS No. 109-53-5), vinyl pivalate (CAS No. 3377-92-2), vinyl benzoate (CAS No. 769-78-8), vinyl valerate (CAS No. 5873-43-8), 2-ethylhexyl vinyl ether (CAS No. 103-44-6), phenyl vinyl ether (CAS No. 766-94-9), tert-butyl vinyl ether (CAS No. 926-02-3), cyclohexyl vinyl ether (CAS No. 2182-55-0), dodecyl vinyl ether (CAS No. 765-14-0), ethyl vinyl ether (CAS No. 109-92-2), propyl vinyl ether (CAS No. 764-47-6), cyclohexane-1,4-dimethanol vinyl ether (CAS No. 114651-37-5) or mixtures thereof.

Monofunctional vinyl monomers used are typically ethylene glycol vinyl ether, di(ethylene glycol) vinyl ether, ethyl vinyl ketone, vinyl acetate, phenyl vinyl ether, cyclohexyl vinyl ether or mixtures thereof, more typically ethyl vinyl ketone, vinyl acetate, ethylene glycol vinyl ether or mixtures thereof.

Difunctional vinyl monomers used may, for example, be di(ethylene glycol) divinyl ether (CAS No. 764-99-8), tri(ethylene glycol) divinyl ether (CAS No. 765-12-8), tetra(ethylene glycol) divinyl ether (CAS No. 83416-06-2), poly(ethylene glycol) divinyl ether (CAS No. 50856-26-3), tri(ethylene glycol) divinyl ether (CAS No. 765-12-8), divinylbenzene (CAS No. 1321-74-0), butane-1,4-diol divinyl ether (CAS No. 3891-33-6), hexane-1,6-diol divinyl ether (CAS No. 19763-13-4), cyclohexane-1,4-dimethanol divinyl ether (CAS No. 17351-75-6), 1,4-pentadien-3-ol (CAS No. 922-65-6) or mixtures thereof.

Difunctional vinyl monomers used as radiation-curable component in the printing ink, typically 3D printing ink, usable for construction of component B of the spectacle lens of the disclosure are typically di(ethylene glycol) divinyl ether, cyclohexane-1,4-dimethanol divinyl ether, poly(ethylene glycol) divinyl ether, divinylbenzene or mixtures thereof, more typically cyclohexane-1,4-dimethanol divinyl ether, divinylbenzene, di(ethylene glycol) divinyl ether or mixtures thereof.

Trifunctional or tetrafunctional vinyl monomers used may, for example, be 1,3,5-trivinylbenzene, 1,2,4-trivinylcyclohexane (CAS No. 2855-27-8), 1,3,5-trivinyl-1,3,5-triazinane-2,4,6-trione, 1,3,5-trivinyl-1,3,5-trimethylcyclotrisiloxane (CAS No. 3901-77-7), 2,4,6-trimethyl-2,4,6-trivinylcyclotrisilazane (CAS No. 5505-72-6), 2,4,6-trivinyl cyclotriboroxane pyridine complex (CAS No. 442850-89-7), tetravinylsilane (CAS No. 1112-55-6), 2,4,6,8-tetramethyl-2,4,6,8-tetravinylcyclotetrasiloxane (CAS No. 2554-06-5) or mixtures thereof.

Trifunctional or tetrafunctional vinyl monomers used are typically 1,3,5-trivinylbenzene, 1,2,4-trivinylcyclohexane, tetravinylsilane or mixtures thereof, more typically 1,3,5-trivinylbenzene, 1,2,4-trivinylcyclohexane or mixtures thereof.

In addition, the printing ink, typically 3D printing ink, usable for construction of component B of the spectacle lens of the disclosure may comprise monofunctional allyl monomers, for example allyl acetate (CAS No. 591-87-7), allyl acetoacetate (CAS No. 1118-84-9), allyl alcohol (CAS No. 107-18-6), allyl benzyl ether (CAS No. 14593-43-2), allyl butyl ether (CAS No. 3739-64-8), allyl butyrate (CAS No. 2051-78-7), allyl ethyl ether (CAS No. 557-31-3), ethylene glycol allyl ether (CAS No. 111-45-5), allyl phenyl ether (CAS No. 1746-13-0), trimethylolpropane allyl ether (CAS No. 682-11-1), 2-allyloxyethanol (CAS No. 111-45-5), 3-allyloxypropane-1,2-diol (CAS No. 123-34-2) or mixtures thereof.

Typically as monofunctional allyl monomers will comprise allyl acetate, allyl alcohol, ethylene glycol allyl ether, allyloxyethanol or mixtures thereof, more typically allyl acetate, allyl alcohol, ethylene glycol allyl ether or mixtures thereof.

Difunctional allyl monomers used may, for example, be allyl ether (CAS No. 557-40-4), 2,2'-diallylbisphenol A (CAS No. 1745-89-7), 2,2'-diallylbisphenol A diacetate ether (CAS No. 1071466-61-9), trimethylolpropane diallyl ether (CAS No. 682-09-7), diallyl carbonate (CAS No. 15022-08-9), diallyl maleate (CAS No. 999-21-3), diallyl succinate (CAS No. 925-16-6), diallyl phthalate (CAS No. 131-17-9), di(ethylene glycol) bis(allylcarbonate) (CAS No. 142-22-3) or mixtures thereof.

Difunctional allyl monomers used are typically allyl ether, 2,2'-diallylbisphenol A, diallyl carbonate, diallyl succinate, di(ethylene glycol) bis(allylcarbonate), diallyl maleate or mixtures thereof, more typically allyl ether, 2,2'-diallylbisphenol A, diallyl carbonate, diethylene glycol diallyl carbonate or mixtures thereof.

Trifunctional or tetrafunctional allyl monomers used may, for example, be 2,4,6-triallyloxy-1,3,5-triazine (CAS No. 101-37-1), 1,3,5-triallyl-1,3,5-triazine-2,4,6(1H,3H,5H)-trione (CAS No. 1025-15-6), 3-(N,N',N'-triallylhydrazine)propionic acid, pentaerythritol allyl ether (CAS No. 91648-24-7), 1,1,2,2-tetraallyloxyethane (CAS No. 16646-44-9), tetraallyl pyromellitate (CAS No. 13360-98-0) or mixtures thereof.

Trifunctional or tetrafunctional allyl monomers used are typically 2,4,6-triallyloxy-1,3,5-triazine, pentaerythritol allyl ether, 1,3,5-triallyl-1,3,5-triazine-2,4,6(1H,3H,5H)-trione or mixtures thereof, more typically 2,4,6-triallyloxy-1,3,5-triazine, pentaerythritol allyl ether or mixtures thereof.

The selection of radiation-curing components to be used is made in such a way that sufficiently crosslinkable but nevertheless rapidly curable monomer mixtures can be obtained.

The total proportion of at least one radiation-curable component in the printing ink, typically 3D printing ink, usable for construction of component B of the spectacle lens of the disclosure is typically within a range from 11.0% by weight to 99.5% by weight, further typically within a range from 17% by weight to 99% by weight, more typically within a range from 31% by weight to 98.5% by weight and most typically within a range from 40% by weight to 98% by weight, based in each case on the total weight of the printing ink, typically 3D printing ink. The above-listed ranges are applicable both to the use of exclusively monofunctional, exclusively difunctional, exclusively trifunctional, exclusively tetrafunctional radiation-curable components and to the use of mixtures of radiation-curable components selected from the group consisting of monofunctional, difunctional, trifunctional and tetrafunctional radiation-curable components. The above-listed ranges are also applicable both to the use of exclusively (meth)acrylate monomers, epoxy monomers, vinyl monomers or allyl monomers and to the use of mixtures thereof. For example, at least one monofunctional (meth)acrylate monomer may be present in a mixture with at least one trifunctional epoxy monomer.

The total proportion of at least one kind of monofunctional (meth)acrylate monomer, epoxy monomer, vinyl monomer or allyl monomer in the printing ink, typically 3D printing ink, usable for construction of component B of the spectacle lens of the disclosure is typically within a range from 0.0% by weight to 60.0% by weight, further typically within a range from 0.3% by weight to 51.0% by weight, more typically within a range from 1.2% by weight to 44.0% by weight and most typically within a range from 1.8% by weight to 35.0% by weight, based in each case on the total weight of the printing ink, typically 3D printing ink. The aforementioned ranges are applicable both to the use of one kind of monofunctional (meth)acrylate monomer, epoxy monomer, vinyl monomer or allyl monomer and to the use of a mixture of different monofunctional (meth)acrylate monomers, epoxy monomers, vinyl monomers or allyl monomers. For example, at least one kind of monofunctional (meth)acrylate monomer may be present in a mixture in each case with at least one kind of monofunctional allyl monomer, or at least one kind of monofunctional (meth)acrylate monomer with at least one different kind of monofunctional (meth)acrylate monomer.

In a typical exemplary embodiment, the printing ink, typically 3D printing ink, usable for construction of component B of the spectacle lens of the disclosure does not comprise any monofunctional (meth)acrylate monomer, epoxy monomer, vinyl monomer or allyl monomer.

The total proportion of at least one kind of difunctional (meth)acrylate monomer, epoxy monomer, vinyl monomer or allyl monomer in the printing ink, typically 3D printing ink, usable for construction of component B of the spectacle lens of the disclosure is typically within a range from 32.0% by weight to 99.0% by weight, further typically within a range from 39.0% by weight to 97.0% by weight, more typically within a range from 47.0% by weight to 95.0% by weight and most typically within a range from 56.0% by weight to 93.0% by weight, based in each case on the total weight of the printing ink, typically 3D printing ink. The aforementioned ranges are applicable both to the use of one kind of difunctional (meth)acrylate monomer, epoxy monomer, vinyl monomer or allyl monomer and to the use of a mixture of different difunctional (meth)acrylate monomers, epoxy monomers, vinyl monomers or allyl monomers. For example, at least one kind of difunctional (meth)acrylate monomer may be present in a mixture with at least one kind of difunctional epoxy monomer, or there may be a mixture of two different kinds of monofunctional (meth)acrylate monomers.

The total proportion of at least one kind of trifunctional (meth)acrylate monomer, epoxy monomer, vinyl monomer or allyl monomer in the printing ink, typically 3D printing ink, usable for construction of component B of the spectacle lens of the disclosure is typically within a range from 1.0% by weight to 51.0% by weight, further typically within a range from 2.0% by weight to 43.0% by weight, more typically within a range from 3.0% by weight to 36.0% by weight and most typically within a range from 4.0% by weight to 31.0% by weight, based in each case on the total weight of the printing ink, typically 3D printing ink. The aforementioned ranges are applicable both to the use of one kind of trifunctional (meth)acrylate monomer, epoxy monomer, vinyl monomer or allyl monomer and to the use of a mixture of different trifunctional (meth)acrylate monomers, epoxy monomers, vinyl monomers or allyl monomers. For example, at least one kind of trifunctional (meth)acrylate monomer may be present in a mixture in each case with at least one kind of trifunctional vinyl monomer, or at least one kind of trifunctional (meth)acrylate monomer with at least one different kind of trifunctional (meth)acrylate monomer.

The total proportion of at least one kind of tetrafunctional (meth)acrylate monomer, epoxy monomer, vinyl monomer or allyl monomer in the printing ink, typically 3D printing ink, usable for construction of component B of the spectacle lens of the disclosure is typically within a range from 0% by weight to 16% by weight, further typically within a range from 0% to 13% by weight, more typically within a range from 0.1% by weight to 9% by weight and most typically within a range from 0.4% by weight to 4% by weight, based in each case on the total weight of the printing ink, typically 3D printing ink. The aforementioned ranges are applicable both to the use of one kind of tetrafunctional (meth)acrylate monomer, epoxy monomer, vinyl monomer or allyl monomer and to the use of a mixture of different tetrafunctional (meth)acrylate monomers, epoxy monomers, vinyl monomers or allyl monomers. For example, at least one kind of tetrafunctional (meth)acrylate monomer may be present in a mixture with at least one other, different kind of tetrafunctional (meth)acrylate monomer, or there may be a mixture of at least one kind of tetrafunctional (meth)acrylate monomer with at least one kind of tetrafunctional allyl monomer.

In a typical exemplary embodiment, the printing ink, typically 3D printing ink, usable for construction of component B of the spectacle lens of the disclosure comprises at least one monofunctional radiation-curable component and at least one difunctional radiation-curable component typically in a weight ratio of 1:1, more typically in a weight ratio of 1:5 and most typically in a weight ratio of 1:10.

In a further exemplary embodiment, the printing ink, typically 3D printing ink, usable for construction of component B of the spectacle lens of the disclosure comprises at least one monofunctional radiation-curable component and at least one trifunctional radiation-curable component typically in a weight ratio of 1:5, more typically in a weight ratio of 1:3 and most typically in a weight ratio of 1:1.

In a further exemplary embodiment, the printing ink, typically 3D printing ink, usable for construction of component B of the spectacle lens of the disclosure comprises at least one difunctional radiation-curable component and at least one trifunctional radiation-curable component in a weight ratio of 1:1, more typically in a weight ratio of 5:1 and most typically in a weight ratio of 8:1.

In a further exemplary embodiment, the printing ink, typically 3D printing ink, usable for construction of component B of the spectacle lens of the disclosure comprises at least one difunctional radiation-curable component and at least one tetrafunctional radiation-curable component in a weight ratio of 5:1, more typically in a weight ratio of 10:1 and most typically in a weight ratio of 20:1.

In a further exemplary embodiment, the printing ink, typically 3D printing ink, usable for construction of component B of the spectacle lens of the disclosure comprises at least one monofunctional radiation-curable component and at least one difunctional radiation-curable component and at least one trifunctional radiation-curable component in a weight ratio of 1:5:1, more typically in a weight ratio of 2:13:0.5 and most typically in a weight ratio of 2:18:0.3.

In a particularly typical exemplary embodiment, the printing ink, typically 3D printing ink, usable for construction of component B of the spectacle lens of the disclosure comprises, as radiation-curable component, at least one kind of difunctional (meth)acrylate monomer and at least one kind of trifunctional (meth)acrylate monomer, where the viscosity of the printing ink, typically 3D printing ink, of the disclosure is ≤50 mPa·s, typically within a range from 5 mPa·s to 33 mPa·s, further typically within a range from 7 mPa·s to 27 mPa·s, more typically within a range from 9 mPa·s to 23 mPa·s and most typically within a range from 11 mPa·s to 21 mPa·s.

In a further typical exemplary embodiment, the printing ink, typically 3D printing ink, usable for construction of component B of the spectacle lens of the disclosure comprises, as radiation-curable component, at least one kind of difunctional epoxy monomer and at least one kind of trifunctional epoxy monomer, where the viscosity of the printing ink, typically 3D printing ink, of the disclosure is ≤53 mPa·s, typically within a range from 4 mPa·s to 31 mPa·s, further typically within a range from 6 mPa·s to 28 mPa·s, more typically within a range from 9 mPa·s to 22 mPa·s and most typically within a range from 10 mPa·s to 20 mPa·s.

In one exemplary embodiment, the printing ink, typically 3D printing ink, usable for construction of component B of the spectacle lens of the disclosure comprises at least one UV initiator. The printing ink, typically 3D printing ink, of the disclosure may comprise, for example, benzophenone (CAS No. 119-61-9), 2-methylbenzophenone (CAS No. 131-58-8), 4-methylbenzophenone (CAS No. 134-84-9), 4,4'-bis(dimethylamino)benzophenone (CAS No. 90-94-8), benzoin (CAS No. 119-53-9), benzoin methyl ether (CAS No. 3524-62-7), benzoin isopropyl ether (CAS No. 6652-28-4), 2,2-dimethoxy-1,2-diphenylethan-1-one (CAS No. 24650-42-8), phenylbis(2,4,6-trimethylbenzoyl)phosphine oxide (CAS No. 162881-26-7), ethyl 2,4,6-trimethylbenzoylphenylphosphinate (CAS No. 84434-11-7), 2-methyl-1-[4-(methylthio)phenyl]-2-(4-morpholinyl)-1-propanone (CAS No. 71868-10-5), 2-hydroxy-2-methyl-1-phenyl-1-propanone (CAS No. 7473-98-5), 2-(dimethylamino)-1-(4-(4-morpholinyl)phenyl)-2-(phenylmethyl)-1-butanone (CAS No. 119313-12-1), diphenyl(2,4,6-trimethylbenzoyl) phosphine oxide (CAS No. 75980-60-8), triarylsulfonium hexafluorophosphate salts (CAS No. 109037-77-6), triarylsulfonium hexafluoroantimonate salts (CAS No. 109037-75-4) or mixtures thereof as UV initiator. The printing ink, typically 3D printing ink, of the disclosure typically comprises benzophenone, 2,2-dimethoxy-1,2-diphenylethan-1-one, phenylbis(2,4,6-trimethylbenzoyl)phosphine oxide, diphenyl(2,4,6-trimethylbenzoyl)phosphine oxide, triarylsulfonium hexafluorophosphate salts or mixtures thereof, more typically 2,2-dimethoxy-1,2-diphenyl ethan-1-one, phenylbis(2,4,6-trimethylbenzoyl)phosphine oxide, diphenyl(2,4,6-trimethylbenzoyl)phosphine oxide or mixtures thereof as UV initiator.

The printing ink, typically 3D printing ink, usable for construction of component B of the spectacle lens of the disclosure comprises the at least one UV initiator in a total proportion from a range from typically 0.01% by weight to 3.7% by weight, more typically from a range from 0.1% by weight to 2.1% by weight and most typically from a range from 0.3% by weight to 1.7% by weight, based in each case on the total weight of the printing ink, typically 3D printing ink.

In one exemplary embodiment, the at least one UV initiator may be used together with a co-initiator. Co-initiators are typically added whenever the UV initiator requires a second molecule to form a free radical active in the UV range. For example, benzophenone requires a second molecule, for example an amine, e.g. triethylamine, methyldiethanolamine or triethanolamine, in order to produce a free radical after absorption of UV light.

The optionally at least one solvent in the printing ink, typically 3D printing ink, usable for construction of component B of the spectacle lens of the disclosure may be selected from the group consisting of alcohols, ketones, esters, ethers, thioethers, amides, hydrocarbons, amines and mixtures thereof. Typically, the optionally at least one solvent is selected from the group consisting of alcohols, ketones, esters and mixtures thereof. In the context of this disclosure, a solvent may firstly be one kind of solvent, and secondly a solvent mixture.

Examples of alcohols usable as solvent are methanol, ethanol, propanol, isopropanol, butanol, pentanol, hexanol or mixtures thereof.

Examples of solvents usable as ketones are acetone, methyl ethyl ketone, cyclohexanone, diisobutyl ketone, methyl propyl ketone, diacetone alcohol or mixtures thereof.

Examples of esters as usable solvents are methyl acetate, ethyl acetate, 1-methoxy-2-propyl acetate, n-propyl acetate, i-propyl acetate, ethoxypropyl acetate, butyl acetate, methyl propionate, ethyl propionate, glycol ether acetates, butyl glycol acetate, propylene glycol diacetate, ethyl lactate or mixtures thereof.

Examples of ethers as usable solvents are diethyl ether, dipropyl ether, tetrahydrofuran, ethylene glycol ethyl ether, ethylene glycol methyl ether, triethylene glycol butyl ether, tetraethylene glycol methyl ether, tetraethylene glycol butyl ether, dipropylene glycol dimethyl ether, propylene glycol butyl ether, 1-methoxy-2-propanol, 3-methoxy-3-methyl-1-butanol or mixtures thereof.

Examples of amides as usable solvents are dimethylacetamide, dimethylformamide, formamide, N-methylformamide, N-methylpyrrolidone and 2-pyrrolidone.

Examples of hydrocarbons as usable solvents are terpenes, such as pinene, limonene or terpinolene, aliphatic hydrocarbons such as hexane, heptane, octane or petroleum spirit, aromatic hydrocarbons such as toluene or xylene.

In one exemplary embodiment, the optionally at least one solvent in the printing ink, especially 3D printing ink, usable for construction of component B of the spectacle lens of the disclosure is selected from the group consisting of isopropanol, ethanol, butanol, diisobutyl ketone, butylglycol, butylglycol acetate, propylene glycol diacetate, dipropylene glycol dimethyl ether, ethyl lactate, ethoxypropyl acetate and mixtures thereof.

In one exemplary embodiment, the optionally at least one solvent has a flashpoint of at least 61° C.

In a typical exemplary embodiment, the proportion of the at least one solvent optionally present in the printing ink, typically 3D printing ink, usable for construction of component B of the spectacle lens of the disclosure is within a range from 0% by weight to 10% by weight, typically within a range from 0% by weight to 7.7% by weight, more typically within a range from 0.1% by weight to 6.3% by weight and most typically within a range from 0.1% by weight to 5.2% by weight, based in each case on the total weight of the printing ink, typically 3D printing ink. In a particularly typical exemplary embodiment, the printing ink, typically 3D printing ink, usable for construction of component B of the spectacle lens of the disclosure does not comprise any solvent.

The printing ink, typically 3D printing ink, usable for construction of component B of the spectacle lens of the disclosure typically has a surface tension from a range from 10 mN/m to 80 mN/m, more typically from a range from 15 mN/m to 40 mN/m and most typically from a range from 18 mN/m to 35 mN/m. If the surface tension is below 10 mN/m, the droplets at the printhead become too large for the desired application. If the surface tension is above 80 mN/m, there is no formation of defined droplets of the printing ink at the printhead. Surface tension is typically determined at a temperature of 25° C. with the Krüss DSA 100 instrument and the pendant drop method.

The viscosity of the printing ink, typically 3D printing ink, usable for construction of component B of the spectacle lens of the disclosure is typically within a range from 4 mPa·s to 56 mPa·s, further typically within a range from 7 mPa·s to 45 mPa·s, more typically within a range from 9 mPa·s to 34 mPa·s and most typically within a range from 10 mPa·s to 22 mPa·s. Viscosity is typically measured with a Malvern C-VOR 150 rheometer with a specified angular velocity of 5.2 rad/sec at 25° C.

In one exemplary embodiment of the disclosure, the printing ink, typically 3D printing ink, usable for construction of component B of the spectacle lens of the disclosure may comprise at least one colorant. Colorants used may be chromatic or achromatic dyes that are soluble or dispersible in the surrounding medium. Depending on the effect to be achieved and/or on the visual impression to be achieved, colorants used, alternatively or additionally to the dyes, may also be pigments that are insoluble in the surrounding medium. Pigments used are typically effect pigments, such as metal effect pigments or pearlescent pigments, organic and/or inorganic pigments. The total proportion of colorant in the printing ink, typically 3D printing ink, usable for construction of component B of the spectacle lens of the disclosure is typically within a range from 0.0% by weight to 66.0% by weight, further typically within a range from 0.01% by weight to 53.1% by weight, more typically within a range from 0.1% by weight to 42.3% by weight and most typically within a range from 0.11% by weight to 27.7% by weight, based in each case on the total weight of the printing ink, typically 3D printing ink. The total proportion of colorant comprises the proportion of all colorants present in the printing ink, typically 3D printing ink, irrespective of whether they are dyes, pigments, mixtures thereof, mixtures of different dyes, mixtures of different pigments etc.

The printing ink, typically 3D printing ink, usable for construction of component B of the spectacle lens of the disclosure is typically produced by mixing all components while stirring, by initially charging the at least one colorant, if present, and first dissolving or dispersing it with a small amount of radiation-curable component and/or solvent and then adding the remaining components.

The printing ink, typically 3D printing ink, usable for construction of component B of the spectacle lens of the disclosure may additionally optionally comprise at least one additive. To the printing ink, typically 3D printing ink, may be added, for example, dispersants, antisettling agents, wetting agents, including anticrater or leveling additives, biocides, UV absorbers or mixtures thereof.

Dispersants help to achieve a homogeneous distribution of all solid constituents in the printing ink, typically 3D printing ink. More particularly, possible agglomeration of the pigments is avoided. Dispersants employed may, for example, be Solsperse 20000, Solsperse 32500, each from Avecia K.K., Disperbyk-102, Disperbyk-106, Disperbyk-111, Disperbyk-161, Disperbyk-162, Disperbyk-163, Disperbyk-164, Disperbyk-166, Disperbyk-180, Disperbyk-190, Disperbyk-191 or Disperbyk-192, each from Byk-Chemie GmbH.

Antisettling agents are intended to prevent settling-out, especially of pigments in the printing ink, typically 3D printing ink. Examples of usable antisettling agents are Byk-405 (from Byk-Chemie GmbH) in conjunction with fumed silicon dioxide, modified ureas such as Byk-410, Byk-411, or waxes such as Ceramat 250, Cerafak103, Cerafak 106 or Ceratix 8461, each from Byk-Chemie GmbH.

Wetting agents are important for the function of the printhead since internal structures such as ducts, filters, nozzle supply chambers etc. are also wetted. Examples of suitable wetting agents include fatty acid alkyl esters, acetylene derivatives, fluorinated esters or fluorinated polymers.

Biocides may be added to printing inks, typically 3D printing inks, in order to prevent growth of microorganisms. Biocides used may, for example, be polyhexamethylenebiguanides, isothiazolones, isothiazolinones, for example 5-chloro-2-methyl-4-isothiazolin-3-one, 2-methyl-4-isothiazolin-3-one or mixtures thereof.

The selection of the suitable UV absorber, which has to be compatible with the other components of the printing ink, especially 3D printing ink, and the 3D printing method, and the optimization of the concentration for achievement of a desired UV absorption property can be determined, for example, with the aid of simulation programs, taking account of suitable material databases.

DE 69534779 T2 discloses a selection of suitable UV absorbers for spectacle lenses which can also be used in the printing ink, typically 3D printing ink, usable for construction of component B of the spectacle lens of the disclosure. Accordingly, the UV absorber may comprise, for example, 2-(2'-hydroxy-5'-methylphenyl)benzotriazole, 2-hydroxy-4-n-acetoxybenzophenone, 2-(2'-hydroxy-5-octylphenyl)benzotriazole, 2-(2'-hydroxy-3,6'-(1,1-dimethylbenzylphenyl) benzotriazole, 2 (2'-hydroxy-3,5'-di-t-amylphenyl)benzotriazole, bis[2-hydroxy-5-methyl-3-(benzotriazol-2-yl)phenyl]methane, bis[2-hydroxy-5-t-octyl-3-(benzo-triazol-2-yl) phenyl]methane, 2-hydroxy-4-(2-acryl oyloxyethoxybenzophenone), 2-hydroxy-4-(2-hydroxy-3-methacryloyloxy)propoxybenzophenone, 2,2'-dihydroxy-4-methoxybenzophenone, 2,4-dihydroxybenzophenone, 2,2'-dihydroxy-4,4-dimethoxybenzophenone, 2,2',4,4'-tetrahydroxybenzophenone, ethyl 2-cyano-3,3-diphenylacrylate, 2-ethylhexyl 2-cyano-3,3-diphenyl acrylate, 2',2',4-trihydroxybenzophenone, 2-hydroxy-4-acryloyloxyethoxybenzophenone (polymer), 2-hydroxy-4-acryloyloxyethoxybenzophenone, 4-hydroxy-4-methoxybenzophenone, 2-hydroxy-4-n-octoxybenzophenone or mixtures thereof.

Typically, the printing ink, typically 3D printing ink, usable for construction of component B of the spectacle lens of the disclosure comprises 2-(2'-hydroxy-5-octylphenyl) benzotriazole, 2-(2'-hydroxy-5'-methylphenyl)benzotriazole, 2-(2'-hydroxy-5-octylphenyl)benzotriazole, 2-hydroxy-4-(2-hydroxy-3-methacryloyloxy)propoxybenzo-phenone or mixtures thereof, more typically 2-(2'-hydroxy-5-octylphenyl)benzotriazole, 2(2'-hydroxy-5-octylphenyl)-benzotriazole or mixtures thereof as UV absorber.

The total proportion of at least one UV absorber in the printing ink, typically UV printing ink, usable for construction of component B of the spectacle lens of the disclosure is typically within a range from 0.01% by weight to 5.1% by weight, more typically within a range from 0.07% by weight to 3.9% by weight and more typically within a range from 0.09% by weight to 3.1% by weight, based in each case on the total weight of the printing ink, typically 3D printing ink, of the disclosure. Aforementioned ranges relate both to the use of a UV absorber and to use of a mixture of UV absorbers.

The total proportion of at least one additive in the printing ink, typically 3D printing ink, usable for construction of component B of the spectacle lens of the disclosure is typically within a range from 0.0% by weight to 10.0% by weight, more typically within a range from 0.01% by weight to 5.0% by weight and most typically within a range from 0.02% by weight to 3.0% by weight, based in each case on the total weight of the printing ink, typically 3D printing ink. The ranges mentioned are applicable to the use of one kind of additive, of a mixture of different kinds of additive and a mixture of different additives from one kind of additive.

It is self-evident that the individual components of the printing ink, typically 3D printing ink, usable for construction of component B of the spectacle lens of the disclosure should be chosen such that their proportions do not add up to more than 100% by weight.

The process for producing a spectacle lens comprising at least components A, B, and C comprises the following steps:
a) providing and optionally fixing the ultrathin lens of component A and/or C,
b) providing a three-dimensional model of component B,
c) digitally cutting the three-dimensional model from step b) into individual two-dimensional slices,
d) providing at least one printing ink, typically 3D printing ink, where the printing ink comprises at least one radiation-curable component,
e) constructing component B from the sum total of the individual two-dimensional slices from step c) by means of a printing operation on one of the ultrathin lenses of components A and/or C,
f) curing component B, typically by means of UV light, wherein the curing can be effected fully or partially after each application of individual volume elements or after application of a slice of volume elements, and the partial curing can be completed on completion of the printing process,
g) optionally machining and/or grinding and/or turning and/or polishing the surface of component B obtained in step f) that does not adjoin one of the ultrathin lenses of component A or C,
h) h1) if the ultrathin lens of component A has been provided in step a): bonding the reverse face $R_B$ of component B of the spectacle lens obtained in step f) comprising components A and B to the front face $V_{DC}$ of an ultrathin lens of component C optionally covered with at least one functional layer $F_{VC}$ or coating the reverse face $R_B$ of component B with at least one functional layer $F_C$;
   i) h2) if the ultrathin lens of component C has been provided in step a): bonding the front face $V_B$ of component B of the spectacle lens obtained in step f) comprising components B and C to the reverse face $R_{DA}$ of an ultrathin lens of component A optionally covered with at least one functional layer $F_{RA}$;
i) optionally coating the front face $V_{DA}$ of the ultrathin lens of component A with at least one functional layer $F_{VA}$ and optionally coating the reverse face $R_{DC}$ of the ultrathin lens of component C with at least one functional layer $F_{RC}$; and
j) optionally edging the spectacle lens obtained in step h) or i) comprising components A, B, and C.

The bonding in step h) is typically effected in a cohesive and/or form-fitting manner by means of an adhesive, a bonding method or by contact bonding, as described above in connection with the production of the spectacle lens of the disclosure proceeding from a semifinished spectacle lens or finished spectacle lens.

The printing, typically 3D printing, of component B of the spectacle lens of the disclosure commences with the provision of a three-dimensional model, typically CAD model. This three-dimensional model defines the surface topography of the surface of component B not defined by the ultrathin lens of component A or C and, in combination of components A, B, and C, the volume of the spectacle lens.

In one exemplary embodiment of the disclosure, the spectacle lens of the disclosure comprises at least one of components A, B, and C more than once. In this exemplary embodiment, the spectacle lens of the disclosure, proceeding from the object-side front face to the eye-side reverse face of the spectacle lens of the disclosure, may comprise, for example, components A, B, A', B', C.

BRIEF DESCRIPTION OF THE DRAWINGS

The disclosure will now be described with reference to the drawings wherein.

DESCRIPTION OF EXEMPLARY EMBODIMENTS

Figure 1:
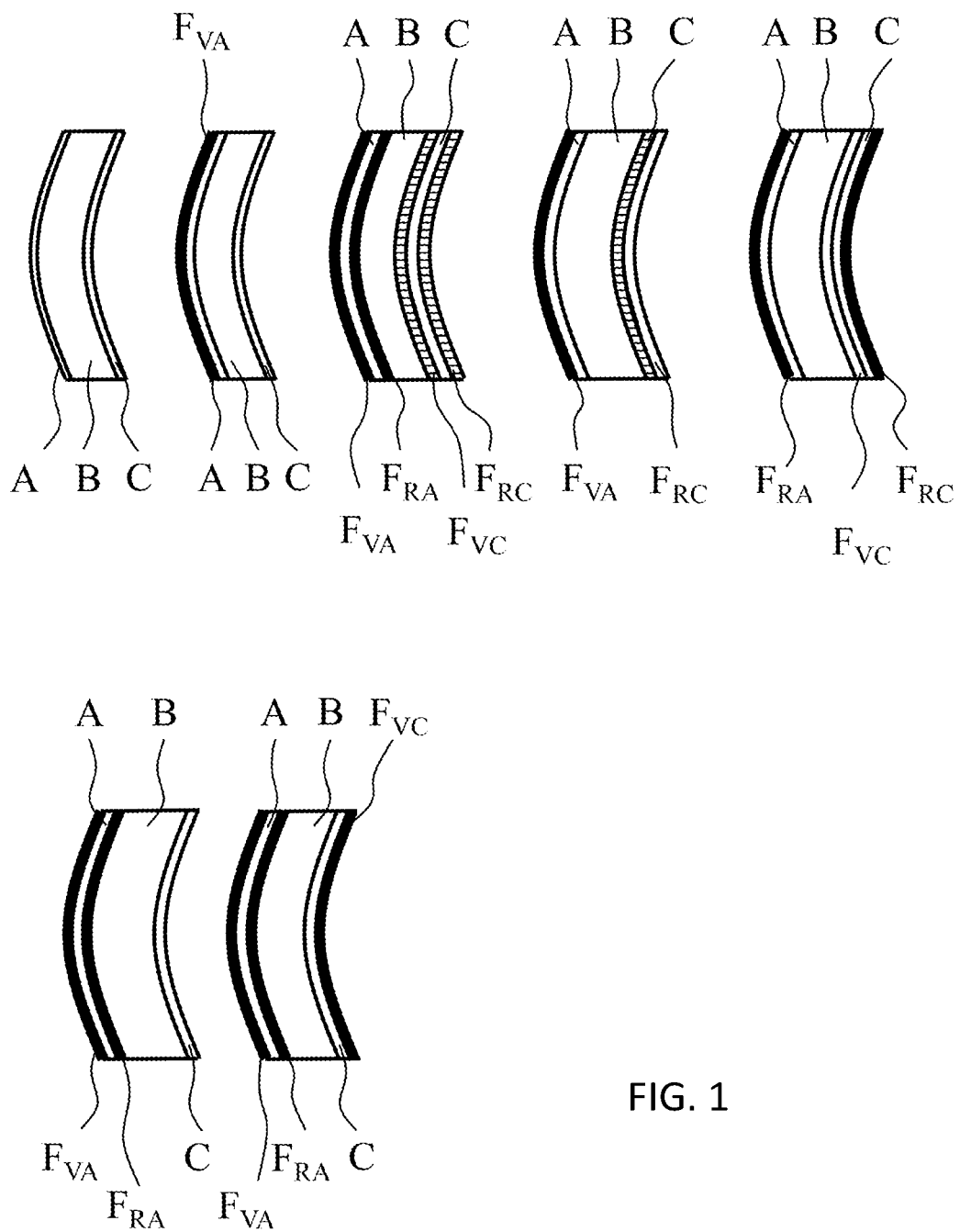
FIG. 1 shows possible exemplary embodiments of coatings of the spectacle lens of the disclosure.
Figure 2:
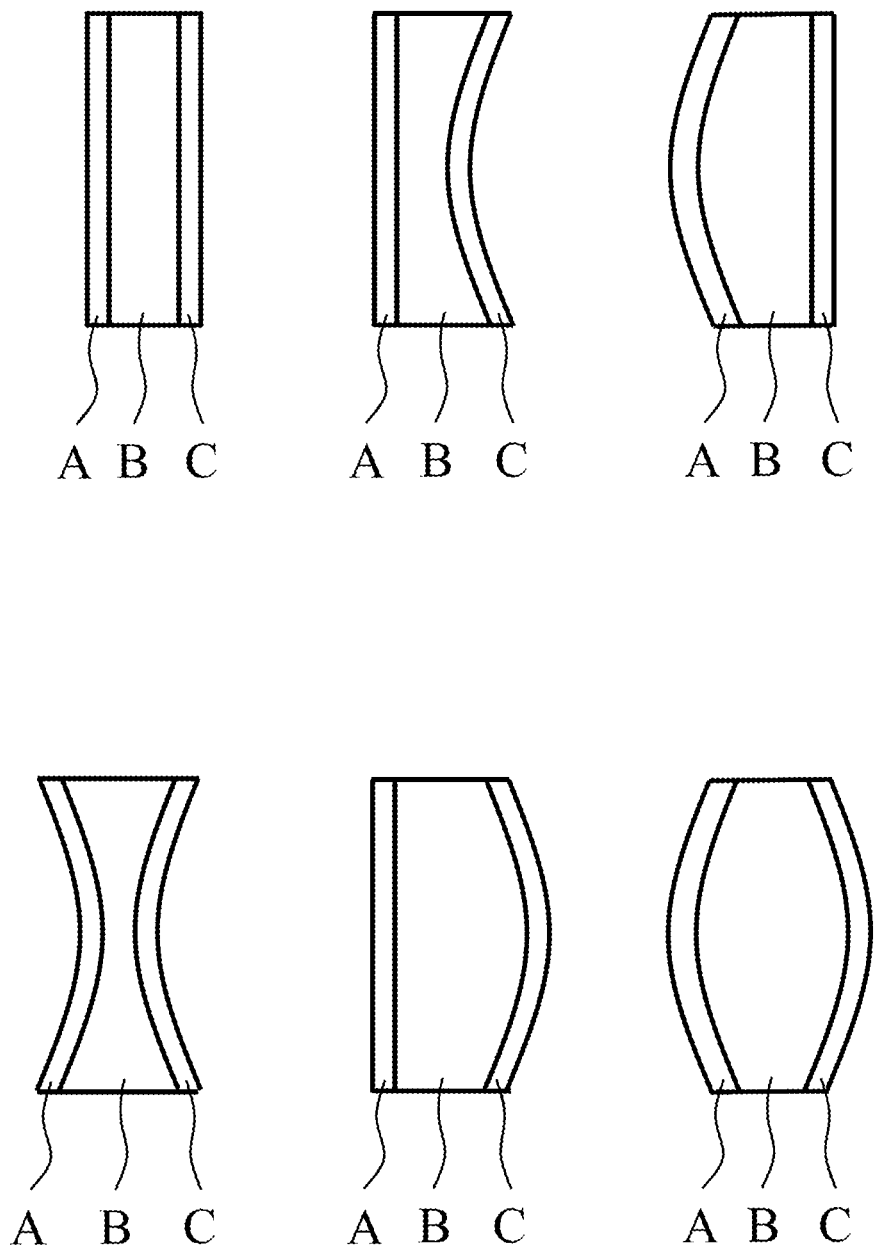
FIG. 2 shows possible surface topographies of the spectacle lens of the disclosure.

There follows a detailed elucidation of the disclosure by some examples, but these do not restrict the disclosure.

I Production of the Spectacle Lenses of the Disclosure

Ia Production of the Spectacle Lenses of the Disclosure Using a Semifinished Spectacle Lens or a Finished Spectacle Lens as Component B

Comparative Example 1

A semifinished spectacle lens based on polythiourethane (MR 8, from Mitsui Chemicals, Inc) which has a front-face radius of curvature of 122 mm and has been covered on the front face $V_B$ with a photochromic layer (PhotoFusion, from ZEISS) was adjusted to an optical strength of 0 dpt by means of abrasive processing on the reverse face $R_B$ of the semifinished spectacle lens. 300 µL of the adhesive according to example 13 of WO 2015/121341 A1 were applied to the middle of the photochromic layer and then the ultrathin lens formed by means of a ceramic mold (ultrathin lens prior to forming: D 263® T eco, from Schott AG) having a radius of curvature of 120 mm was pressed manually onto the photochromic layer, such that the adhesive was distributed uniformly between the reverse face $R_{DA}$ of the ultrathin lens and the photochromic layer. To cure the adhesive, the spectacle lens comprising components A and B was stored at 25° C. for 24 hours.

Example 1

The spectacle lens from comparative example 1 was applied, on the reverse face $R_B$, via spin-coating, the hard lacquer layer according to example 2 of EP 2 578 649 A1, which was partly dried at 40° C. for one hour. Thereafter, the front face of the ultrathin lens and the outside hard lacquer layer were each subjected to vapor deposition of an antireflection layer (DuraVision Platinum, from ZEISS) and then of the clean-coat layer (AFP 3000+, from Cotec GmbH), each by means of a PVD method.

Comparative Example 2

A metal mirror of $SiO_2$—Cr—$SiO_2$ in a total layer thickness of 65 nm was applied by vapor deposition to the concave reverse face $R_{DA}$ of an ultrathin lens formed by means of a ceramic mold (ultrathin lens prior to forming: AF 32® eco, from Schott AG) having a thickness of 100 μm and a radius of curvature of 120 mm. The reflective ultrathin lens thus obtained was bonded by means of 300 μL of the adhesive according to example 12 of WO 2015/121341 A1, which was applied to the middle of the metal mirror, to the convex front face $V_B$ of the finished spectacle lens based on polyallyldiglycol carbonate (CR 39, PPG Industries, Inc.) with −2.00 dpt by pressing it on manually, and stored at 25° C. for 24 hours.

Example 2

The spectacle lens from comparative example 2 was covered, on the reverse face of the finished spectacle lens $R_B$, via spin-coating, with the hard lacquer layer according to example 3 of EP 2 578 649 A1 and partly dried at 40° C. for one hour. Subsequently, the front face of the ultrathin lens and the hard lacquer layer were each subjected to vapor deposition of the antireflection layer (DuraVision Platinum, from ZEISS) and the clean-coat layer (Optron Surfclear 100, from Canon), each by means of a PVD method.

Comparative Example 3

A finished spectacle lens based on polyallyldiglycol carbonate (RAV7NT, from Acomon AG) having a front-face radius of curvature of 121 mm with −2.00 dpt was provided, on the front face $V_B$, with 300 μL of the adhesive according to example 7 of WO 2015/121341 A1, and an ultrathin lens formed by means of a ceramic mold (ultrathin lens prior to forming: AF 32® eco, from Schott AG) having a radius of curvature of 120 mm was pressed on manually, such that the adhesive was distributed homogeneously between the reverse face of the ultrathin lens and the front face of the finished spectacle lens. Subsequently, the spectacle lens comprising components A and B was stored at 25° C. for 24 hours.

Example 3

The spectacle lens from comparative example 3 was applied, on the reverse face of the finished spectacle lens, via spin-coating, a hard lacquer layer according to example 2 of EP 2 578 649 A1, which was partly dried at 40° C. for one hour. The antireflection layer (DuraVision Platinum, from ZEISS) and the clean-coat layer (Satin 380, from Satisloh) were each applied by vapor deposition to the front face of the ultrathin lens and the outside hard lacquer layer, each by means of a PVD method.

Example 4

A finished spectacle lens based on polyallyldiglycol carbonate (CR 39, from PPG Industries, Inc.) having a front-face radius of curvature of 121 mm and −2.00 dpt was provided, on the front face $V_B$, with 300 μL of the adhesive according to example 1 of DE 10 2014 202 609A1 and pressed onto the reverse face $R_{DA}$ of an ultrathin lens formed by means of a ceramic mold (ultrathin lens prior to forming: AF 32® eco, from Schott AG) having a radius of 120 mm, such that the adhesive was distributed homogeneously between the reverse face of the ultrathin lens $R_{DA}$ and the front face of the finished spectacle lens $V_B$. The spectacle lens thus obtained comprising components A and B was stored at 25° C. for 24 hours. Thereafter, the hard lacquer layer according to example 2 of EP 2 578 649 A1 was applied via spin-coating on the reverse face of the finished spectacle lens $R_B$, and was cured at 60° C. for 15 minutes.

Example 5

The spectacle lens from comparative example 2 was applied, on the reverse face of the finished spectacle lens, via spin-coating, a hard lacquer layer according to example 2 of EP 2 578 649 A1, which was partly dried at 45° C. for one hour. The antireflection layer (DuraVision Platinum, from ZEISS) and the clean-coat layer (EverClean IV, Umicore AG & Co. KG) were each applied by vapor deposition to the front face of the ultrathin lens and the outside hard lacquer layer, each by means of a PVD method.

Comparative Example 4

A semifinished spectacle lens based on polyallyldiglycol carbonate (CR 39, from PPG Industries, Inc.) was adjusted to a radius of curvature of 120 mm by means of abrasive processing on the reverse face $R_B$ of the semifinished spectacle lens. 300 μL of the adhesive according to example 2 of WO 2015/121341 A1 were applied to the middle of the reverse face and then the ultrathin lens formed by means of a ceramic mold (ultrathin lens prior to forming: D 263® T eco, from Schott AG) having a radius of curvature of 120 mm was pressed on manually, such that the adhesive was distributed uniformly between the convex front face $V_{DC}$ of the ultrathin lens and the concave reverse face $R_B$. To cure the adhesive, the spectacle lens comprising components B and C was stored at 25° C. for 24 hours. The spectacle lens was applied on the front face $V_B$ via spin-coating the hard lacquer layer according to example 2 of EP 2 578 649 A1, which was partly dried at 40° C. for 15 minutes. Thereafter, the front face of the ultrathin lens and the outside hard lacquer layer were each subjected to vapor deposition of an antireflection layer (DuraVision Platinum, from ZEISS) and then of the clean-coat layer (AFP 3000+, from Cotec GmbH), each by means of a PVD method.

Example 6

300 μL of the adhesive according to example 4 of WO 2015/121341 A1 were applied to the spectacle lens as from comparative example 4 without front face coating on the front face of the finished spectacle lens and then the ultrathin lens formed by means of a ceramic mold (ultrathin lens prior to forming: D 263® T eco, from Schott AG) having a radius of curvature of 120 mm was pressed on manually, such that the adhesive was distributed uniformly between the reverse face $R_{DA}$ of the ultrathin lens and the front face $V_B$. To cure the adhesive, the spectacle lens comprising components A, B, and C was stored at 25° C. for 24 hours. The antireflection layer (DuraVision Platinum, from ZEISS) and the clean-coat layer (EverClean IV, Umicore AG & Co. KG) were each applied by vapor deposition to the two outer faces, each by means of a PVD method.

Comparative Example 5

A finished spectacle lens based on polyallyldiglycol carbonate (CR 39, from PPG Industries, Inc.) having a front-face radius of curvature of 121 mm and −2.00 dpt.

Comparative Example 6

A semifinished spectacle lens based on polyallyldiglycol carbonate (CR 39, from PPG Industries, Inc.) was adjusted to a radius of curvature of 120 mm by means of abrasive processing on the reverse face $R_B$ of the semifinished spectacle lens. 300 μL of the adhesive according to example 2 of WO 2015/121341 A1 were applied to the middle of the reverse face and then the ultrathin lens formed by means of a ceramic mold (ultrathin lens prior to forming: D 263® T eco, from Schott AG) having a radius of curvature of 120 mm was pressed on manually, such that the adhesive was distributed uniformly between the front face $V_{DC}$ of the ultrathin lens and the reverse face $R_B$. To cure the adhesive, the spectacle lens comprising components B and C was stored at 25° C. for 24 hours.

Example 7

A finished spectacle lens based on polyallyldiglycol carbonate (RAV700, from Acomon AG) having a physical planar geometry and a middle thickness of 2 mm was provided, on the front face $V_B$, with 300 μL of the adhesive according to example 11 of WO 2015/121341 A1, and a round and planar ultrathin lens (AF 32® eco, from Schott AG) was pressed on manually, such that the adhesive was distributed homogeneously between the reverse face of the ultrathin lens and the front face of the finished spectacle lens. Subsequently, the spectacle lens comprising components A and B was stored at 25° C. for 24 hours. The lens was applied on the reverse face $R_B$ via spin-coating a hard lacquer layer according to example 2 of EP 2 578 649 A1, which was partly dried at 40° C. for 30 minutes. The antireflection layer (DuraVision Platinum, from ZEISS) and the clean-coat layer (Satin 380, from Satisloh) were each applied by vapor deposition to the front face of the ultrathin lens and the outside hard lacquer layer, each by means of a PVD method.

Example 8

A finished spectacle lens based on polyallyldiglycol carbonate (CR 39, from PPG Industries, Inc.) having a front-face radius of curvature of 121 mm and −2.00 dpt was provided, on the front face $V_B$, with 300 μL of the adhesive according to example 12 of WO 2015/121341 A1 and pressed onto the reverse face $R_{DA}$ of an ultrathin lens formed by means of a ceramic mold (ultrathin lens prior to forming: AF 32® eco, from Schott AG) having a radius of 120 mm, such that the adhesive was distributed homogeneously between the reverse face of the ultrathin lens $R_{DA}$ and the front face of the finished spectacle lens $V_B$. The spectacle lens thus obtained comprising components A and B was stored at 25° C. for 24 hours. Thereafter, the hard lacquer layer according to example 2 of EP 2 578 649 A1 was applied via spin-coating on the reverse face of the finished spectacle lens $R_B$, and was cured at 40° C. for 15 minutes. Subsequently, the front face of the ultrathin lens and the hard lacquer layer were each subjected to vapor deposition of the antireflection layer (DuraVision Platinum, from ZEISS) and the clean-coat layer (Optron Surfclear 100, from Canon), each by means of a PVD method.

Comparative Example 7

A finished spectacle lens based on polyallyldiglycol carbonate (RAV7NT, from Acomon AG) having a physical planar geometry and a middle thickness of 2 mm was provided, on the front face $V_B$, with 300 μL of the adhesive according to example 11 of WO 2015/121341 A1, and a round and planar ultrathin lens (D 263® T eco, from Schott AG) was pressed on manually, such that the adhesive was distributed homogeneously between the reverse face of the ultrathin lens and the front face of the finished spectacle lens. Subsequently, the spectacle lens comprising components A and B was stored at 25° C. for 24 hours.

Example 9

The spectacle lens from comparative example 7 was applied, on the reverse face of the finished spectacle lens, via spin-coating, a hard lacquer layer according to example 2 of EP 2 578 649 A1, which was partly dried at 40° C. for one hour. The antireflection layer (DuraVision Platinum, from ZEISS) and the clean-coat layer (EverClean IV, Umicore AG & Co. KG) were each applied by vapor deposition to the front face of the ultrathin lens and the outside hard lacquer layer, each by means of a PVD method.

Example 10

The spectacle lens from comparative example 7 was provided, on the reverse face, with 300 μL of the adhesive according to example 8 of WO 2015/121341 A1, and a round and planar ultrathin lens (D 263® T eco, from Schott AG) was pressed on manually, such that the adhesive was distributed homogeneously between the reverse face of the ultrathin lens and the front face of the finished spectacle lens. Subsequently, the spectacle lens comprising components A, B, and C was stored at 25° C. for 24 hours. The antireflection layer (DuraVision Platinum, from ZEISS) and the clean-coat layer (Optron OR-210 D, Canon AG) were applied by vapor deposition to both sides of the lens, each by means of a PVD method.

Comparative Example 8

A finished spectacle lens based on polythiourethane (MR 8, from Mitsui Chemicals, Inc) having a physical planar geometry and a middle thickness of 2 mm was provided, on the front face $V_B$, with 300 μL of the adhesive according to example 5 of WO 2015/121341 A1, and a round and planar ultrathin lens (D 263® T eco, from Schott AG) was pressed on manually, such that the adhesive was distributed homogeneously between the reverse face of the ultrathin lens and the front face of the finished spectacle lens. Subsequently, the spectacle lens comprising components A and B was stored at 25° C. for 24 hours.

Example 11

The spectacle lens from comparative example 8 was provided, on the reverse face, with 300 μL of the adhesive according to example 12 of WO 2015/121341 A1, and a round and planar ultrathin lens (D 263® T eco, from Schott AG) was pressed on manually, such that the adhesive was distributed homogeneously between the reverse face of the ultrathin lens and the front face of the finished spectacle lens. Subsequently, the spectacle lens comprising components A, B, and C was stored at 25° C. for 24 hours. The antireflection layer (DuraVision Platinum, from ZEISS) and the clean-coat layer (Optron OR-210 D, Canon AG) were each applied by vapor deposition to the front face and the reverse face of the spectacle lens, each by means of a PVD method.

Comparative Example 9

A finished spectacle lens based on polyallyldiglycol carbonate (RAV700, from Acomon AG) having a front-face radius of curvature of 121 mm and −2.00 dpt that had been provided with a commercial hard lacquer similarly to example 3 of EP 2 578 649 A1 and with a reflection layer. The reflection layer was applied by vapor deposition by a PVD method from $SiO_2$—Cr—$SiO_2$ in a total layer thickness of 65 nm.

Comparative Example 10

A semifinished spectacle lens based on polythiourethane (MR 8, from Mitsui Chemicals, Inc) which has a front-face radius of curvature of 122 mm and has been covered on the front face $V_B$ with a photochromic layer (PhotoFusion, from ZEISS) was adjusted to an optical strength of 0 dpt by means of abrasive processing on the reverse face $R_B$ of the semifinished spectacle lens.

Comparative Example 11

A finished spectacle lens based on polyallyldiglycol carbonate (RAV700, from Acomon AG) having a front-face radius of curvature of 121 mm and −2.00 dpt that had been provided with a hard lacquer according to example 3 of EP 2 578 649 A1 via a dip-coating method. Via the hard coating, an antireflection layer (LotuTec, from ZEISS) and the clean-coat layer (Duralon 300, Cotec GmbH) were applied via PVD methods.

Example Lens 12:

A finished spectacle lens based on crown glass (UV-W76, D0391, from Schott AG) having a front-face radius of curvature of 120 mm and −2.00 dpt was provided on the front face $V_B$ with 200 µL of the adhesive according to example 4 of WO 2015/121341 A1. An ultrathin lens formed by means of a ceramic mold (ultrathin lens prior to forming: AF 32® eco, from Schott AG) having a radius of 120 mm was pressed onto the finished spectacle lens, such that the adhesive was distributed homogeneously between the reverse face of the ultrathin lens $R_{DA}$ and the front face of the finished spectacle lens $V_B$. The spectacle lens thus obtained comprising components A and B was stored at 80° C. for 4 hours. Thereafter, the antireflection layer (LotuTec, from ZEISS) and the clean-coat layer (Optron Surfclear 100, from Canon) were applied by vapor deposition to the front face of the ultrathin lens and the reverse face of the crown glass, each by means of a PVD method.

Example Lens 13:

A finished spectacle lens based on crown glass (UV-W76, D0391, from Schott AG) having a front-face radius of curvature of 120 mm and −2.00 dpt was provided on the front face $V_B$ with a UV-curing photochromic layer (PhotoFusion, from ZEISS). 300 µL of the adhesive according to example 4 of WO 2015/121341 A1 were applied to the surface of the phototropic coating. An ultrathin lens formed by means of a ceramic mold (ultrathin lens prior to forming: D 263® T eco, from Schott AG) having a radius of 120 mm was pressed onto the finished spectacle lens, such that the adhesive was distributed homogeneously between the reverse face of the ultrathin lens $R_{DA}$ and the photochromic layer present on the front face of the finished spectacle lens $V_B$. The adhesive layer in the spectacle lens thus obtained comprising components A and B was cured at 70° C. for 3.5 hours. Thereafter, the antireflection layer (LotuTec, from ZEISS) and the clean-coat layer (AFP 3000+, from Cotec GmbH) were applied by vapor deposition to the front face of the ultrathin lens and the reverse face of the crown glass, each by means of a PVD method.

Example Lens 14:

A finished spectacle lens based on crown glass (UV-W76, D0391, from Schott AG) having a front-face radius of curvature of 90 mm and 0.00 dpt was adhesive-bonded, on the front face $V_B$, a polarizing film. For this purpose, 300 µL of the adhesive according to example 6 of WO 2015/121341 A1 were applied and the preformed polarizing film (TAC-PVA-TAC) having a radius of curvature of 90 mm was pressed on, such that the adhesive was distributed homogeneously. This semifinished product was precured at 50° C. for 15 minutes. 300 µL of the adhesive according to example 6 of WO 2015/121341 A1 were applied to the surface of the polarizing film. An ultrathin lens formed by means of a ceramic mold (ultrathin lens prior to forming: D 263® T eco, from Schott AG) having a radius of 90 mm was pressed onto the finished spectacle lens, such that the adhesive was distributed homogeneously between the reverse face of the ultrathin lens $R_{DA}$ and the polarizing film present on the front face of the finished spectacle lens $V_B$. The adhesive layer in the spectacle lens thus obtained comprising components A and B was cured at 50° C. for 2.0 hours. Thereafter, the antireflection layer (LotuTec, from ZEISS) and the clean-coat layer (Optron OR-210 D, Canon AG) were applied by vapor deposition to the front face of the ultrathin lens and the reverse face of the crown glass, each by means of a PVD method.

II Characterization of the Spectacle Lenses of the Disclosure and of the Spectacle Lenses from the Comparative Examples IIa Determination of the Photochromic Properties The photochromic properties were determined on the spectacle lenses of comparative example 1 and of comparative example 10:

|  | Comparative example 1 | Comparative example 10 |
|---|---|---|
| Transmission |  |  |
| Initial [%] | 82.0 | 85.4 |
| Dark (illuminated for 15 min) [%] | 10.5 | 7.8 |
| After storage in the dark for 30 [%] | 79.5 | 84.2 |
| Photochromic ratio [%] | 7.8 | 10.9 |
| Time |  |  |
| Darkening to ¼ of the initial transmission [sec] | 48 | 33 |
| Lightening to ¾ of the initial transmission [sec] | 180 | 126 |

Transmission measurements were effected to DIN 1836.

The differences in the measurements for the spectacle lenses from comparative examples 1 and 10 arise from the elevated reflectivity of the spectacle lens from comparative example 1, in which additional reflections occur at the ultrathin lens, and these reduce the effective illuminance at the photochromic layer.

IIb Determination of the Water Absorption Capacity of the Spectacle Lens

Figure 3:
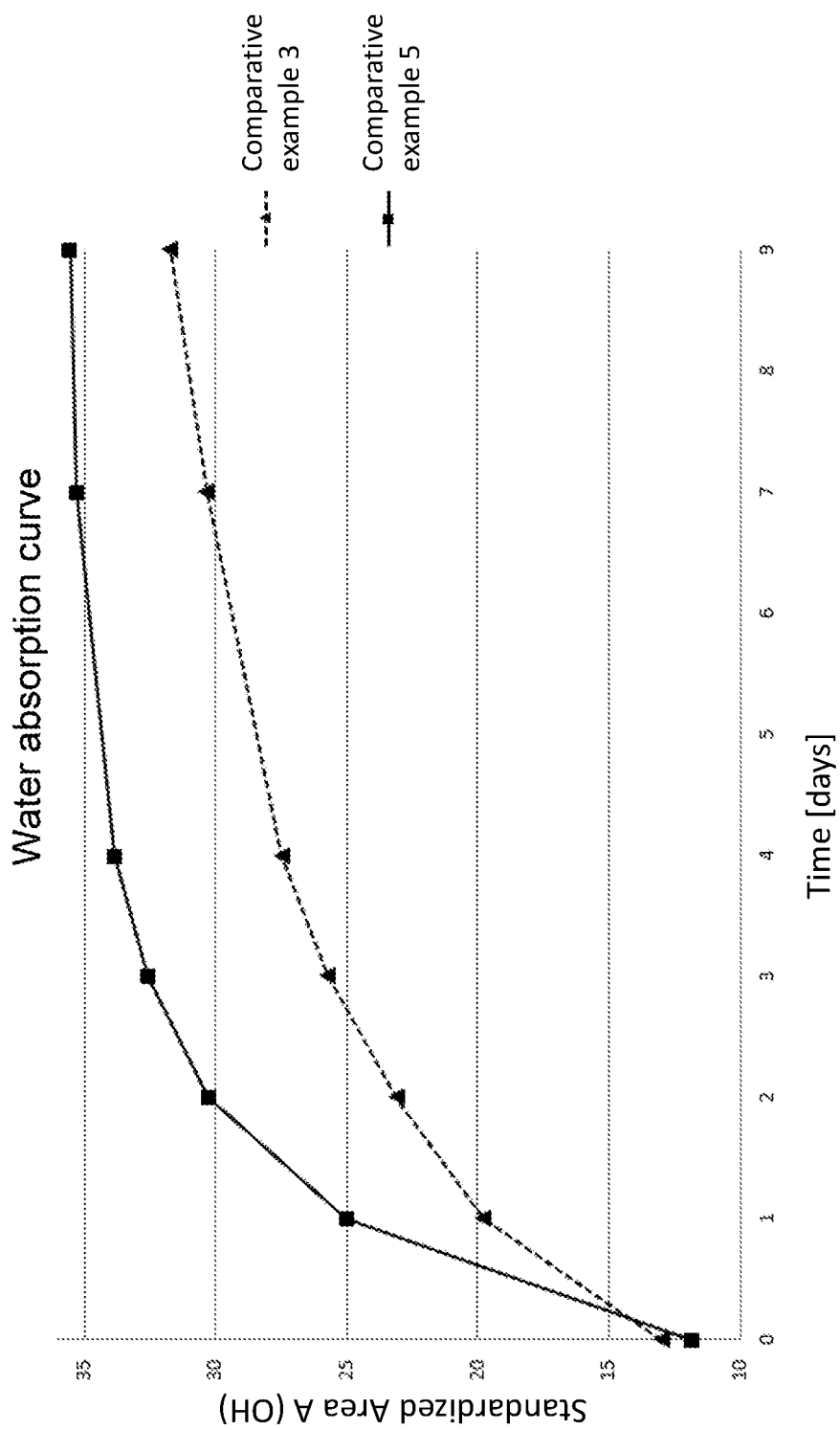
FIG. 3 shows the water absorption capacity of two comparative examples.

The spectacle lens from comparative example 3 was stored at 40° C. and 95% relative air humidity in order to test water absorption by comparison with unchanged and uncoated starting material from comparative example 5. The water content was measured regularly over 9 days by the method disclosed in DE 1 9519 975 C1, and the resulting water absorption curve was documented. The progression of the curve (dotted line in FIG. 3) shows about half the rate of water absorption.

The water barrier is calculated as WB=1−(water absorption on day 1 for comparative example 3/water absorption on day 1 for comparative example 5)=0.49. The sample absorbs only 49% of the maximum possible amount of water within 24 hours.

IIc Determination of Transmission

The transmission of the spectacle lenses was measured with the Perkin Elmer Lambda 950 instrument between 280 and 780 nm.

|  | Lower limit of UV radiation (max. transmission 2%) | Light transmittance [%], D65, 2° |
|---|---|---|
| Comparative example 2 | 360 nm | 33.1 |
| Comparative example 4 | 365 nm | 98.3 |
| Comparative example 5 | 350 nm | 91.5 |
| Comparative example 6 | 360 nm | 91.8 |
| Example 7 | 360 nm | 98.8 |
| Example 8 | 360 nm | 98.2 |
| Comparative example 7 | 355 nm | 92.0 |
| Comparative example 8 | 375 nm | 90.8 |

The transmission and the lower UV radiation limit transmitted through the spectacle lens corresponds to the value for a standard lens (comparative example 5) without an ultrathin lens. A spectacle lens with an ultrathin lens finished with an antireflection coating (comparative example 4, examples 7 and 8) achieves the customarily desired transmission of >98%. Comparative example 4 with a reflection layer attains a customary transmission of 33.1%.

IIc Scratch Test

By conventional scratching techniques (weighted diamond) for spectacle lenses, it is not possible to penetrate the ultrathin lens, and hence functional layers between A and B, or B and C when C is an ultrathin lens, are protected from environmental effects. For this purpose, comparative example 3 was scratched with a diamond with rising weights. Isolated traces were visible over and above 150 g; a continuous scratch trace formed over and above 200 g, in each case without flaking or gouging. Comparative example 11 already showed gouging at 150 g.

IId Bayer Test

The spectacle lens from comparative example 3 was fixed in parallel with the spectacle lens from comparative example 9 in a metal pan at a distance of 10 cm and agitated together with 500±5 g of alundum from Norton (Saint Gobain) for 300 cycles. Thereafter, the positions of the two spectacle lenses in the metal pan were exchanged and they were agitated for a further 300 cycles. Scattered light was measured before and after this treatment.

|  | Starting state % scattered light | Final state % scattered light |
|---|---|---|
| Comparative example 3 | 14.7 | 14.5 |
| Comparative example 9 | 0.44 | 1.79 |

There was a distinct increase in scattered light from comparative example 9 during the Bayer test, whereas comparative example 3 varied only within the scope of measurement accuracy. The mirror, which is sensitive to the effect of scratches, is thus protected very much better from environmental effects in comparative example 3.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens comprising, proceeding from a front face on an object side of the spectacle lens to an opposite reverse face of the spectacle lens:
    a component A including an ultrathin lens;
    a component B including at least one of a polymeric material or a mineral glass; and
    a component C including the ultrathin lens,
    wherein the ultrathin lens of the component A and the ultrathin lens of the component C each include a glass composition selected from the group consisting of borosilicate glass, aluminoborosilicate glass, and alkali-free borosilicate glass, and wherein the glass composition of the ultrathin lens of component A and of the ultrathin lens of component C is the same or different,
    wherein the ultrathin lens of the component A and the ultrathin lens of the component C each have an average thickness of from 13 µm to 760 µm, and wherein the average thickness of the ultrathin lens of the component A and of the ultrathin lens of the component C is the same or different,
    wherein at least one of a reverse face of the ultrathin lens of the component A or the front face of the component B includes the at least one functional layer, the component B includes a finished spectacle lens, a surface topography of each of the components A, B, and C is planar, spherical, aspherical, toric or atoric, the surface topography of a respective front face and a respective reverse face of the components A and C is a same, the surface topography of the component A is the same as or different than the surface topography of the component C, the surface topography of the component A is the same as the surface topography of the front face of the component B, and the surface topography of the component C is the same as the surface topography of the reverse face of the component B, and wherein the spectacle lens has at least one dioptric power and the component B has a calculated location-dependent refractive index distribution.

2. The spectacle lens as claimed in claim 1, wherein a relative standard deviation of a thickness distribution of the ultrathin lens of the component A and of the ultrathin lens of the component C is of from 0.1% to 100%.

3. The spectacle lens as claimed in claim 1, wherein the ultrathin lens of the component A and the ultrathin lens of the component C do not contain a colorant, do not have photochromic properties, or do not contain the colorant and do not have the photochromic properties.

4. The spectacle lens as claimed in claim 1, wherein at least one of the ultrathin lens of the component A or the ultrathin lens of the component C includes the at least one functional layer on a front face of the ultrathin lens of the component A or on the reverse face of the ultrathin lens of the component C, respectively.

5. The spectacle lens as claimed in claim 4, wherein the at least one of the functional layer of the ultrathin lens of the component A or the at least one functional layer of the ultrathin lens of the component C is selected from the group consisting of an antireflection layer, an electrically conductive layer, a semiconductive layer, an antifog layer, and a clean-coat layer.

6. The spectacle lens as claimed in in claim 4, wherein the at least one functional layer of the ultrathin lens of the component A or the at least one functional layer of the ultrathin lens of the component C in each case includes at least one antireflection layer and in each case at least one clean-coat layer, and the clean-coat layer on the front face of the ultrathin lens of the component A is an outermost layer on the object side and the clean-coat layer on the reverse face of the ultrathin lens of the component C is the outermost layer on the eye side.

7. The spectacle lens as claimed in claim 1, wherein the at least one functional layer of the ultrathin lens of the component A is selected from the group consisting of at least one coloring layer, at least one photochromic layer, at least one polarizing layer, and at least one reflection layer.

8. The spectacle lens as claimed in claim 7, wherein, proceeding from the front face on the object side to the opposite eye-side reverse face, one of the following combinations of the functional layer is present in the sequence specified between components A and B:

component A/photochromic layer/polarizing layer/coloring layer/component B, component A/photochromic layer/coloring layer/polarizing layer/component B, component A/photochromic layer/polarizing layer/reflection layer/component B, component A/photochromic layer/reflection layer/polarizing layer/component B, component A/photochromic layer/reflection layer/component B, component A/reflection layer/polarizing layer/coloring layer/component B, component A/polarizing layer/coloring layer/component B, component A/reflection layer/polarizing layer/component B or component A/reflection layer/coloring layer/component B.

9. The spectacle lens as claimed in claim 1, wherein the reverse face of the ultrathin lens of the component A includes a reflection layer as the functional layer and the front face of the ultrathin lens of the component A does not comprise an antireflection layer, or wherein the reverse face of the ultrathin lens of the component A includes a reflection layer as the functional layer and the front face of the ultrathin lens of the component A includes a clean-coat layer, or wherein the front face of the ultrathin lens of the component A includes an antireflection layer as the functional layer and the reverse face of the ultrathin lens of the component A includes a photochromic layer as the functional layer.

10. The spectacle lens as claimed in claim 1, wherein the ultrathin lens of the component C includes a coloring layer as the functional layer on the front face.

11. A process for producing the spectacle lens as claimed in claim 1, the spectacle lens including, proceeding from the front face on the object side of the spectacle lens to the opposite reverse face of the spectacle lens, at least the components A, B, and C, wherein the component A includes the ultrathin lens, the component B includes the at least one of the polymeric material or the mineral glass, the component C includes the ultrathin lens, the process comprising:

providing the ultrathin lens of the component A and providing the ultrathin lens of the component C;

coating the reverse face of the ultrathin lens of the component A with the at least one functional layer;

providing the component B including the polymeric material or the mineral glass having a calculated location-dependent refractive index distribution as a finished spectacle lens;

bonding the coated reverse face of the component A to the front face of the component B and bonding the reverse face to the front face of the ultrathin lens of the component C; and edging the spectacle lens including the components A, B, and C to produce a finished spectacle lens.

12. The process for producing a spectacle lens as claimed in claim 11, wherein the front face of the finished spectacle lens has been coated with the at least one functional layer and the reverse face of the finished spectacle lens has been coated with the at least one functional layer.

13. The process for producing a spectacle lens as claimed in claim 11, wherein the ultrathin lens of the component A and the ultrathin lens of the component C have been formed, and the front face of the ultrathin lens of the component C has been coated with the at least one functional layer, the front face of the ultrathin lens of the component A has been coated with the at least one functional layer, and the reverse face of the ultrathin lens of the component C has been coated with the at least one functional layer.

14. A process for producing a spectacle lens, the spectacle lens including, proceeding from a front face on an object side of the spectacle lens to an opposite reverse face of the spectacle lens, at least components A, B, and C, wherein the component A includes an ultrathin lens, the component B includes a polymeric material, and the component C includes the ultrathin lens, the process comprising:

providing the ultrathin lens of the component A and the ultrathin lens of the component C, wherein the ultrathin lens of the component A and the ultrathin lens of the component C each includes a glass composition selected from the group consisting of borosilicate glass, aluminoborosilicate glass, and alkali-free borosilicate glass, wherein the glass composition of the ultrathin lens of the component A and of the ultrathin lens of the component C is the same or different, and the ultrathin lens of the component A and the ultrathin lens of the component C each have an average thickness of from 13 µm to 760 µm, wherein the average thickness of the ultrathin lens of the component A and of the ultrathin lens of the component C is the same or different;

providing a three-dimensional model of the component B;

digitally cutting the three-dimensional model of the component B into individual two-dimensional slices;

providing at least one printing ink;

constructing component B with a printing operation on one of the ultrathin lens of the component A or the ultrathin lens of the component C as a sum total of the individual two-dimensional slices;

curing the component B, wherein the curing is effected fully or partially after each application of individual volume elements or after the application of a slice of volume elements, and the partial curing is completed on completion of the printing process;

bonding the reverse face of the component B of the spectacle lens including the components A and B to the front face of the ultrathin lens of the component C if the ultrathin lens of the component A has been provided; or bonding the front face of the component B of the spectacle lens including the components B and C to the reverse face of the ultrathin lens of the component A covered with at least one functional layer if the ultrathin lens of the component C has been provided.

15. The process as claimed in claim 14, further comprising:
    a) performing at least one of machining, grinding, turning, or polishing the surface of the component B that does not adjoin one of the ultrathin lenses of component A or C;
    b) coating the front face of the ultrathin lens of the component A with the at least one functional layer and coating the reverse face of the ultrathin lens of the component C with the at least one functional layer; and
    c) edging the spectacle lens including the components A, B, and C.

16. The process as claimed in claim 14, further comprising:
    bonding the components A, B, and C by means of an adhesive, by means of a bonding method, or by means of contact bonding.

17. The process as claimed in claim 14, further comprising:
    bonding the components A, B, and C with an adhesive based on an amine-catalyzed thiol hardening of epoxy resins at a temperature of from 20° C. to 80° C.

* * * * *